US012295900B1

(12) United States Patent
Solana

(10) Patent No.: US 12,295,900 B1
(45) Date of Patent: May 13, 2025

(54) SYSTEMS, METHODS, AND DEVICES FOR PERCUSSIVE MASSAGE THERAPY WITH VOICE ACTIVATION

(71) Applicant: Therabody, Inc., Los Angeles, CA (US)

(72) Inventor: Jaime Sanchez Solana, Los Angeles, CA (US)

(73) Assignee: Therabody, Inc., Los Angeles, CA (US)

(*) Notice: Subject to any disclaimer, the term of this patent is extended or adjusted under 35 U.S.C. 154(b) by 0 days.

(21) Appl. No.: 18/069,841

(22) Filed: Dec. 21, 2022

(51) Int. Cl.
| | |
|---|---|
| *A61H 23/00* | (2006.01) |
| *G06F 40/279* | (2020.01) |
| *G10L 15/18* | (2013.01) |
| *G10L 15/22* | (2006.01) |
| *H04R 1/02* | (2006.01) |

(Continued)

(52) U.S. Cl.
CPC ......... *A61H 23/006* (2013.01); *G06F 40/279* (2020.01); *G10L 15/18* (2013.01); *G10L 15/22* (2013.01); *H04R 1/028* (2013.01); *H04R 1/04* (2013.01); *H04R 3/00* (2013.01); *A61H 2201/0153* (2013.01); *A61H 2201/1207* (2013.01); *A61H 2201/5007* (2013.01); *A61H 2201/5043* (2013.01);

(Continued)

(58) Field of Classification Search
CPC .................................................. A61H 23/006
See application file for complete search history.

(56) References Cited

U.S. PATENT DOCUMENTS

| | | |
|---|---|---|
| 657,765 A | 9/1900 | Gibbs |
| 675,772 A | 6/1901 | Ferguson |

(Continued)

FOREIGN PATENT DOCUMENTS

| | | |
|---|---|---|
| AT | 510048 A1 | 1/2012 |
| AU | 2019204770 B1 | 10/2019 |

(Continued)

OTHER PUBLICATIONS

Amazon: "OIVO Xbox One Controller Charger Dual Charging Station Updated Strap, Remote Charger Dock-2 Rechargeable Battery Packs Included," OIVO, Sep. 6, 2018, Especially annotated figures, Retrieved from Entire Document, 11 Pages.

(Continued)

*Primary Examiner* — LaToya M Louis
(74) *Attorney, Agent, or Firm* — Sterne, Kessler, Goldstein & Fox P.L.L.C.

(57) ABSTRACT

Described herein are systems, methods, and devices for providing percussive massage therapy with voice activation features. A percussive massage device including a housing, a motor, a switch, a microphone, a speaker, and a controller is described. The controller of the percussive massage device includes at least one processor and a memory, and the controller is coupled to the switch, the microphone, and the speaker. The controller of the percussive massage device is configured to receive, from the microphone, a voice input of a user of the percussive massage device, perform, by the at least one processor, speech recognition of the voice input, determine, by the at least one processor, an audio output based on the speech recognition of the voice input, and transmit an audio signal to the speaker to transmit the audio output to the user of the percussive massage device.

11 Claims, 6 Drawing Sheets

(51) Int. Cl.
 *H04R 1/04* (2006.01)
 *H04R 3/00* (2006.01)
(52) U.S. Cl.
 CPC ............. *A61H 2201/5048* (2013.01); *A61H 2201/5097* (2013.01); *G10L 2015/223* (2013.01); *H04R 2499/11* (2013.01)

(56) References Cited

U.S. PATENT DOCUMENTS

| | | |
|---|---|---|
| 1,545,027 A | 7/1925 | Ashlock |
| 1,594,636 A | 8/1926 | Smith |
| 1,657,765 A | 1/1928 | Pasque |
| 1,784,301 A | 12/1930 | Mekler |
| D91,454 S | 2/1934 | Decker |
| D93,943 S | 11/1934 | Harry |
| 2,179,594 A | 11/1939 | Johnson |
| D118,980 S | 2/1940 | Gilbert |
| D129,045 S | 8/1941 | Glenn |
| 2,391,671 A | 12/1945 | Berg |
| D143,678 S | 1/1946 | Snyder et al. |
| 2,475,861 A | 7/1949 | Alfred |
| D161,484 S | 1/1951 | Curtis |
| D163,324 S | 5/1951 | Charles |
| D180,923 S | 9/1957 | Nicholas |
| D181,742 S | 12/1957 | Alfred |
| 2,931,632 A | 4/1960 | De et al. |
| 2,987,334 A | 6/1961 | Wendling |
| 3,053,559 A | 9/1962 | Norval |
| 3,077,837 A | 2/1963 | Sidney et al. |
| D195,145 S | 4/1963 | Robert |
| D197,142 S | 12/1963 | James |
| 3,172,675 A | 3/1965 | Gonzalez |
| D207,505 S | 4/1967 | Whitman |
| 3,452,226 A | 6/1969 | Hettich |
| 3,545,301 A | 12/1970 | Richter |
| 3,626,934 A | 12/1971 | Andis |
| 3,699,952 A | 10/1972 | Waters et al. |
| 3,705,579 A | 12/1972 | Morini et al. |
| D230,522 S | 2/1974 | Rothman |
| D237,454 S | 11/1975 | James |
| D237,455 S | 11/1975 | Schramm |
| 3,942,251 A | 3/1976 | Griffies et al. |
| 3,968,789 A | 7/1976 | Simoncini |
| 4,031,763 A | 6/1977 | Eisenberg |
| 4,046,142 A | 9/1977 | Whitney |
| 4,088,128 A | 5/1978 | Mabuchi |
| 4,150,668 A | 4/1979 | Johnston |
| 4,158,246 A | 6/1979 | Meadows et al. |
| 4,173,217 A | 11/1979 | Johnston |
| 4,203,431 A | 5/1980 | Abura et al. |
| D265,985 S | 8/1982 | House, II |
| 4,506,159 A | 3/1985 | Reuter et al. |
| 4,513,737 A | 4/1985 | Mabuchi |
| 4,533,796 A | 8/1985 | Engelmore |
| 4,549,535 A | 10/1985 | Wing |
| 4,565,189 A | 1/1986 | Mabuchi |
| 4,566,442 A | 1/1986 | Mabuchi et al. |
| 4,596,406 A | 6/1986 | Van Vleet et al. |
| D287,814 S | 1/1987 | Hiraishi et al. |
| 4,691,693 A | 9/1987 | Sato |
| 4,692,958 A | 9/1987 | McMakin |
| D292,368 S | 10/1987 | Mikiya |
| 4,730,605 A | 3/1988 | Noble et al. |
| D300,132 S | 3/1989 | Culbertson et al. |
| 4,815,224 A | 3/1989 | Miller |
| 4,841,955 A | 6/1989 | Evans et al. |
| D303,373 S | 9/1989 | Ching, Jr. |
| D310,005 S | 8/1990 | Precht |
| D314,320 S | 2/1991 | Brosius et al. |
| 4,989,613 A | 2/1991 | Finkenberg |
| 4,991,298 A | 2/1991 | Matre |
| 5,014,681 A | 5/1991 | Heeman et al. |
| D320,379 S | 10/1991 | Culbertson |
| D321,338 S | 11/1991 | Sakamoto et al. |
| 5,085,207 A | 2/1992 | Fiore |
| 5,088,474 A | 2/1992 | Mabuchi et al. |
| 5,092,317 A | 3/1992 | Zelikovski |
| 5,103,809 A | 4/1992 | DeLuca et al. |
| 5,123,139 A | 6/1992 | Leppert et al. |
| D329,166 S | 9/1992 | Doggett |
| D329,291 S | 9/1992 | Wollman |
| D329,292 S | 9/1992 | Wollman |
| D331,467 S | 12/1992 | Wollman |
| D334,012 S | 3/1993 | Chen |
| 5,201,149 A | 4/1993 | Eisenblatter |
| 5,207,697 A | 5/1993 | Carusillo et al. |
| 5,212,887 A | 5/1993 | Farmerie |
| D338,802 S | 8/1993 | Maass |
| D345,077 S | 3/1994 | Maass |
| D345,727 S | 4/1994 | Flowers et al. |
| D345,888 S | 4/1994 | Joss et al. |
| D349,029 S | 7/1994 | Matsunaga et al. |
| 5,417,644 A | 5/1995 | Lee |
| D363,352 S | 10/1995 | Huen |
| D367,712 S | 3/1996 | Young |
| 5,501,657 A | 3/1996 | Feero |
| D374,934 S | 10/1996 | Lie |
| 5,569,168 A | 10/1996 | Hartwig |
| 5,573,500 A | 11/1996 | Katsunuma et al. |
| 5,656,017 A | 8/1997 | Keller et al. |
| 5,656,018 A | 8/1997 | Tseng |
| D383,366 S | 9/1997 | Heck |
| D383,435 S | 9/1997 | Svetlik |
| D384,639 S | 10/1997 | Kawakami et al. |
| D387,728 S | 12/1997 | Kawakami et al. |
| D388,175 S | 12/1997 | Lie |
| D397,991 S | 9/1998 | Kawakami et al. |
| D400,161 S | 10/1998 | Nagele et al. |
| D400,758 S | 11/1998 | Hippen et al. |
| 5,860,669 A | 1/1999 | Wass et al. |
| D408,543 S | 4/1999 | Back |
| 5,910,197 A | 6/1999 | Chaconas |
| 5,925,002 A | 7/1999 | Wollman |
| D412,485 S | 8/1999 | Kato et al. |
| 5,935,089 A | 8/1999 | Shimizu |
| 5,951,501 A | 9/1999 | Griner |
| D417,648 S | 12/1999 | Clowers et al. |
| 6,003,052 A | 12/1999 | Yamagata |
| 6,006,631 A | 12/1999 | Miner et al. |
| D425,014 S | 5/2000 | Willkens et al. |
| D430,774 S | 9/2000 | Naft et al. |
| D430,938 S | 9/2000 | Lee |
| D432,077 S | 10/2000 | Zurwelle et al. |
| D433,300 S | 11/2000 | Buck |
| 6,146,383 A | 11/2000 | Studer et al. |
| 6,165,145 A | 12/2000 | Noble |
| D439,984 S | 4/2001 | Thach |
| D440,136 S | 4/2001 | Buck |
| 6,227,959 B1 | 5/2001 | Beaudry |
| 6,228,042 B1 | 5/2001 | Dungan |
| 6,228,120 B1 | 5/2001 | Leonard et al. |
| 6,245,031 B1 | 6/2001 | Pearson |
| 6,290,660 B1 | 9/2001 | Epps et al. |
| D448,852 S | 10/2001 | Engelen |
| 6,401,289 B1 | 6/2002 | Herbert |
| 6,406,445 B1 | 6/2002 | Ben-Nun |
| 6,432,072 B1 | 8/2002 | Harris et al. |
| 6,537,236 B2 | 3/2003 | Tucek et al. |
| 6,539,328 B1 | 3/2003 | Cremonese et al. |
| D474,445 S | 5/2003 | Matsuoka et al. |
| 6,558,338 B1 | 5/2003 | Wasserman |
| 6,568,089 B1 | 5/2003 | Popik et al. |
| D475,595 S | 6/2003 | Hatch et al. |
| D475,679 S | 6/2003 | Cooper et al. |
| D476,746 S | 7/2003 | Harris et al. |
| 6,599,250 B2 | 7/2003 | Webb et al. |
| 6,599,260 B2 | 7/2003 | Tucek et al. |
| D478,385 S | 8/2003 | Dirks et al. |
| D481,279 S | 10/2003 | Buck |
| 6,663,657 B1 | 12/2003 | Miller |
| 6,682,496 B1 | 1/2004 | Pivaroff |
| 6,715,781 B1 | 4/2004 | Smith |
| 6,723,050 B2 | 4/2004 | Dow et al. |
| 6,723,060 B2 | 4/2004 | Miller |

(56) References Cited

U.S. PATENT DOCUMENTS

| | | |
|---|---|---|
| 6,758,826 B2 | 7/2004 | Luettgen et al. |
| 6,805,700 B2 | 10/2004 | Miller |
| 6,823,762 B2 | 11/2004 | Hu |
| 6,846,295 B1 | 1/2005 | Ben-Nun |
| D504,111 S | 4/2005 | Ozawa et al. |
| D510,317 S | 10/2005 | Sun |
| 6,994,575 B1 | 2/2006 | Clark et al. |
| 7,041,072 B2 | 5/2006 | Calvert |
| D530,270 S | 10/2006 | Ozawa et al. |
| 7,128,721 B2 | 10/2006 | Ferber et al. |
| D531,733 S | 11/2006 | Burout, III et al. |
| 7,169,169 B2 | 1/2007 | Tucek et al. |
| 7,223,250 B2 | 5/2007 | Brattesani et al. |
| D544,102 S | 6/2007 | Pivaroff |
| D544,436 S | 6/2007 | Kawahara et al. |
| D547,264 S | 7/2007 | Kondo |
| D553,252 S | 10/2007 | Masuda |
| D553,562 S | 10/2007 | Okada et al. |
| 7,384,405 B2 | 6/2008 | Rhoades |
| D575,224 S | 8/2008 | Taniguchi et al. |
| 7,431,706 B2 | 10/2008 | Louis |
| D579,868 S | 11/2008 | Harrison |
| D580,353 S | 11/2008 | Harrison et al. |
| 7,470,081 B2 | 12/2008 | Miyahara et al. |
| D587,977 S | 3/2009 | Waldron |
| 7,497,639 B2 | 3/2009 | Lebot et al. |
| 7,503,923 B2 | 3/2009 | Miller |
| D593,204 S | 5/2009 | Manke et al. |
| 7,549,966 B2 | 6/2009 | Fujii et al. |
| D597,482 S | 8/2009 | Kondo et al. |
| D604,235 S | 11/2009 | Tarter |
| D605,586 S | 12/2009 | Tong |
| D606,192 S | 12/2009 | Summerer et al. |
| 7,731,672 B2 | 6/2010 | Chiang |
| 7,740,249 B1 | 6/2010 | Gao |
| D622,660 S | 8/2010 | Taniguchi et al. |
| 7,857,729 B2 | 12/2010 | Sullivan et al. |
| D631,315 S | 1/2011 | Xue et al. |
| 7,877,880 B2 | 2/2011 | Royle |
| 7,927,259 B1 | 4/2011 | Rix |
| 7,927,294 B2 | 4/2011 | Kamimura et al. |
| 7,946,977 B2 * | 5/2011 | Klearman ............... A61H 19/32 600/38 |
| 7,963,717 B2 | 6/2011 | Seger |
| 7,996,996 B2 | 8/2011 | Hirabayashi |
| D649,657 S | 11/2011 | Petersen et al. |
| D658,759 S | 5/2012 | Marescaux et al. |
| D659,644 S | 5/2012 | Gretz |
| D666,303 S | 8/2012 | Ding et al. |
| 8,313,450 B2 | 11/2012 | Ben-Nun |
| 8,342,187 B2 | 1/2013 | Kalman et al. |
| D682,195 S | 5/2013 | Aglassinger |
| 8,435,194 B2 | 5/2013 | Dverin et al. |
| 8,479,616 B2 | 7/2013 | Tsai |
| 8,517,895 B2 * | 8/2013 | Shalev ..................... A63B 5/20 482/121 |
| 8,622,943 B2 | 1/2014 | Ben-Nun |
| 8,646,348 B2 | 2/2014 | Hung |
| D703,337 S | 4/2014 | Fuhr et al. |
| D703,480 S | 4/2014 | Lownds |
| 8,695,461 B2 | 4/2014 | Moss et al. |
| D706,433 S | 6/2014 | Fuhr et al. |
| D708,742 S | 7/2014 | Dallemagne et al. |
| 8,770,882 B2 | 7/2014 | Ersoy |
| 8,777,881 B2 | 7/2014 | Tsai |
| 8,864,143 B2 | 10/2014 | Lin |
| 8,870,796 B2 | 10/2014 | Hoffmann |
| D722,016 S | 2/2015 | Beukema |
| 8,945,104 B2 | 2/2015 | Boone, III et al. |
| 8,951,216 B2 | 2/2015 | Yoo et al. |
| D726,495 S | 4/2015 | Ryan |
| 9,017,273 B2 | 4/2015 | Burbank et al. |
| D734,863 S | 7/2015 | Hennessey |
| D735,348 S | 7/2015 | Hennessey |
| 9,107,486 B2 | 8/2015 | Brewer et al. |
| 9,132,058 B2 | 9/2015 | Imboden et al. |
| 9,138,257 B2 | 9/2015 | Revivo |
| D740,222 S | 10/2015 | Tang |
| 9,272,837 B2 | 3/2016 | Linzell |
| D756,180 S | 5/2016 | Chen |
| D759,237 S | 6/2016 | Heath et al. |
| D759,238 S | 6/2016 | Heath et al. |
| 9,364,385 B2 | 6/2016 | Yang |
| D763,442 S | 8/2016 | Price et al. |
| 9,416,805 B2 | 8/2016 | Cascolan et al. |
| D776,612 S | 1/2017 | Chen et al. |
| D778,439 S | 2/2017 | Håkansson et al. |
| 9,597,256 B1 | 3/2017 | Paul |
| 9,677,901 B2 * | 6/2017 | Yamamoto ......... G01C 21/3655 |
| 9,744,600 B2 | 8/2017 | Yang et al. |
| 9,872,813 B2 | 1/2018 | Giraud et al. |
| 9,889,066 B2 | 2/2018 | Danby et al. |
| D817,732 S | 5/2018 | Rettler |
| D817,869 S | 5/2018 | Lee et al. |
| D819,221 S | 5/2018 | Lei |
| 9,981,366 B2 | 5/2018 | Todd et al. |
| D823,478 S | 7/2018 | Park |
| 10,034,813 B1 | 7/2018 | Silver |
| D826,418 S | 8/2018 | Lad |
| D837,395 S | 1/2019 | Gan |
| D838,378 S | 1/2019 | Cao |
| D840,547 S | 2/2019 | Harle et al. |
| 10,201,470 B2 | 2/2019 | Griner |
| D842,489 S | 3/2019 | Spewock et al. |
| D842,491 S | 3/2019 | Fleming et al. |
| D843,656 S | 3/2019 | Zhang et al. |
| D844,896 S | 4/2019 | Levi et al. |
| D847,362 S | 4/2019 | Tang |
| D847,364 S | 4/2019 | Lee et al. |
| 10,252,051 B2 | 4/2019 | Nichols |
| 10,276,844 B2 | 4/2019 | Wackwitz et al. |
| D847,990 S | 5/2019 | Kimball |
| 10,314,762 B1 | 6/2019 | Marton et al. |
| 10,335,345 B2 | 7/2019 | Choe |
| 10,357,425 B2 | 7/2019 | Wersland et al. |
| D855,822 S | 8/2019 | Marton et al. |
| D858,432 S | 9/2019 | Altenburger |
| D862,382 S | 10/2019 | Altenburger |
| D866,790 S | 11/2019 | Lee et al. |
| D867,279 S | 11/2019 | Altenburger |
| 10,557,490 B2 | 2/2020 | Wersland et al. |
| D877,351 S | 3/2020 | Wersland et al. |
| D880,419 S | 4/2020 | Hernandez et al. |
| D880,714 S | 4/2020 | Wersland et al. |
| D880,715 S | 4/2020 | Wersland et al. |
| D880,716 S | 4/2020 | Wersland et al. |
| D884,205 S | 5/2020 | Zhuang |
| 10,702,448 B2 | 7/2020 | Wersland et al. |
| D893,738 S | 8/2020 | Zhuang |
| 10,758,027 B2 | 9/2020 | Skidmore et al. |
| 10,857,064 B2 | 12/2020 | Wersland et al. |
| 10,918,565 B2 | 2/2021 | Wersland et al. |
| 10,945,915 B2 | 3/2021 | Wersland et al. |
| 10,959,674 B2 | 3/2021 | Leaper |
| 10,959,908 B2 | 3/2021 | Lee et al. |
| 10,959,911 B2 | 3/2021 | Wersland et al. |
| D919,560 S | 5/2021 | Taniguchi et al. |
| 10,993,874 B1 | 5/2021 | Marton et al. |
| 11,090,221 B1 * | 8/2021 | Haddock DiCarlo ...................... A61H 23/0254 |
| 11,160,723 B2 | 11/2021 | Wersland et al. |
| 11,432,994 B2 * | 9/2022 | Wersland ............... G16H 20/30 |
| 11,452,670 B2 * | 9/2022 | Wersland ........... A61H 23/0254 |
| 11,478,400 B1 | 10/2022 | Marton et al. |
| 11,478,606 B1 | 10/2022 | English et al. |
| 11,488,592 B2 * | 11/2022 | Kim .................... A61H 23/006 |
| 11,564,860 B2 * | 1/2023 | Wersland ............... A61H 15/02 |
| 2001/0016697 A1 | 8/2001 | Gorsen |
| 2001/0027280 A1 | 10/2001 | Huang |
| 2002/0057203 A1 * | 5/2002 | Borders ................. G16H 40/67 340/539.11 |
| 2002/0082532 A1 | 6/2002 | Tucek et al. |
| 2002/0115947 A1 | 8/2002 | Young |
| 2002/0177795 A1 | 11/2002 | Frye |

(56) References Cited

U.S. PATENT DOCUMENTS

| | | |
|---|---|---|
| 2002/0183668 A1 | 12/2002 | Huang |
| 2002/0188233 A1 | 12/2002 | Denyes |
| 2003/0009116 A1 | 1/2003 | Luettgen et al. |
| 2003/0014079 A1 | 1/2003 | Tucek |
| 2003/0028134 A1 | 2/2003 | Lev et al. |
| 2003/0094356 A1 | 5/2003 | Waldron |
| 2003/0144615 A1 | 7/2003 | Lin |
| 2003/0195443 A1 | 10/2003 | Miller |
| 2004/0176710 A1 | 9/2004 | Kennedy et al. |
| 2005/0075591 A1 | 4/2005 | Hafemann |
| 2005/0109137 A1 | 5/2005 | Hartmann |
| 2005/0113870 A1 | 5/2005 | Miller |
| 2005/0126018 A1 | 6/2005 | Haas |
| 2005/0131461 A1 | 6/2005 | Tucek et al. |
| 2005/0203445 A1 | 9/2005 | Tsai |
| 2005/0235988 A1 | 10/2005 | Hansen et al. |
| 2005/0252011 A1 | 11/2005 | Neumeier |
| 2006/0025710 A1 | 2/2006 | Schulz et al. |
| 2006/0047315 A1 | 3/2006 | Colloca et al. |
| 2006/0074455 A1 | 4/2006 | Strandberg |
| 2006/0116614 A1 | 6/2006 | Jones et al. |
| 2006/0118841 A1 | 6/2006 | Eliason et al. |
| 2006/0123941 A1 | 6/2006 | Wadge |
| 2006/0192527 A1 | 8/2006 | Kageler et al. |
| 2006/0211961 A1 | 9/2006 | Meyer et al. |
| 2006/0272664 A1 | 12/2006 | O'Dwyer |
| 2007/0129220 A1 | 6/2007 | Bardha |
| 2007/0144310 A1 | 6/2007 | Pozgay et al. |
| 2007/0150004 A1 | 6/2007 | Colloca et al. |
| 2007/0173886 A1 | 7/2007 | Rousso et al. |
| 2007/0179414 A1 | 8/2007 | Imboden et al. |
| 2007/0270727 A1 | 11/2007 | Khorassani Zadeh |
| 2007/0282228 A1 | 12/2007 | Einav et al. |
| 2008/0077061 A1 | 3/2008 | Dehli |
| 2008/0097260 A1 | 4/2008 | Tsukada et al. |
| 2008/0103419 A1 | 5/2008 | Adamson |
| 2008/0146980 A1 | 6/2008 | Rousso et al. |
| 2008/0167588 A1 | 7/2008 | Chen |
| 2008/0169715 A1 | 7/2008 | Mills et al. |
| 2008/0177207 A1 | 7/2008 | Liao |
| 2008/0185888 A1 | 8/2008 | Beall et al. |
| 2008/0200849 A1 | 8/2008 | Hollington et al. |
| 2008/0243041 A1 | 10/2008 | Brenner et al. |
| 2008/0306417 A1 | 12/2008 | Imboden et al. |
| 2008/0312568 A1 | 12/2008 | Chen |
| 2008/0314610 A1 | 12/2008 | Meixner |
| 2009/0112134 A1 | 4/2009 | Avni |
| 2009/0188119 A1 | 7/2009 | Oberheim |
| 2009/0270777 A1 | 10/2009 | Wu et al. |
| 2009/0309313 A1 | 12/2009 | Knorr et al. |
| 2009/0326540 A1 | 12/2009 | Estes |
| 2010/0100119 A1 | 4/2010 | Herndon |
| 2010/0137752 A1 | 6/2010 | Heine et al. |
| 2010/0137907 A1 | 6/2010 | Tsai |
| 2010/0145242 A1 | 6/2010 | Tsai |
| 2010/0160841 A1 | 6/2010 | Wu |
| 2010/0162579 A1 | 7/2010 | Naughton et al. |
| 2010/0176919 A1 | 7/2010 | Myers et al. |
| 2010/0204694 A1 | 8/2010 | Mehta et al. |
| 2010/0210194 A1 | 8/2010 | Thomaschewski et al. |
| 2010/0274162 A1 | 10/2010 | Evans |
| 2010/0286569 A1 | 11/2010 | Nagano |
| 2010/0298863 A1 | 11/2010 | Hindinger et al. |
| 2011/0037431 A1 | 2/2011 | Mackle |
| 2011/0055720 A1 | 3/2011 | Potter et al. |
| 2011/0098537 A1* | 4/2011 | Justis ............... A61B 17/0206 600/210 |
| 2011/0098615 A1* | 4/2011 | Whalen ............... A63B 22/02 601/151 |
| 2011/0118637 A1 | 5/2011 | Lev et al. |
| 2011/0201979 A1 | 8/2011 | Voss et al. |
| 2011/0224580 A1 | 9/2011 | Leathers et al. |
| 2011/0314677 A1 | 12/2011 | Meier et al. |
| 2012/0059294 A1 | 3/2012 | Schubert et al. |
| 2012/0065556 A1 | 3/2012 | Smith et al. |
| 2012/0078071 A1 | 3/2012 | Bohm et al. |
| 2012/0124758 A1 | 5/2012 | Sabisch et al. |
| 2012/0161706 A1 | 6/2012 | Zhou |
| 2012/0197357 A1 | 8/2012 | Dewey et al. |
| 2012/0207147 A1* | 8/2012 | MacDonald ........ H04L 65/4015 370/352 |
| 2012/0232445 A1 | 9/2012 | Lev et al. |
| 2012/0238922 A1 | 9/2012 | Stemple et al. |
| 2012/0253245 A1 | 10/2012 | Stanbridge |
| 2013/0014968 A1 | 1/2013 | Kehoe et al. |
| 2013/0030506 A1 | 1/2013 | Bartolone et al. |
| 2013/0046212 A1 | 2/2013 | Nichols |
| 2013/0052871 A1 | 2/2013 | Eklind |
| 2013/0085421 A1 | 4/2013 | Gillespie et al. |
| 2013/0116503 A1 | 5/2013 | Mertens et al. |
| 2013/0133210 A1 | 5/2013 | Weir et al. |
| 2013/0138023 A1 | 5/2013 | Lerro |
| 2013/0218058 A1 | 8/2013 | Ceoldo et al. |
| 2013/0237751 A1 | 9/2013 | Alexander |
| 2013/0241470 A1 | 9/2013 | Kim |
| 2013/0261516 A1 | 10/2013 | Cilea et al. |
| 2013/0261517 A1 | 10/2013 | Rodgers |
| 2013/0271067 A1 | 10/2013 | Yu et al. |
| 2013/0281897 A1 | 10/2013 | Hoffmann et al. |
| 2013/0304642 A1 | 11/2013 | Campos |
| 2014/0024982 A1 | 1/2014 | Doyle |
| 2014/0031866 A1 | 1/2014 | Fuhr et al. |
| 2014/0097793 A1 | 4/2014 | Wurtz et al. |
| 2014/0101872 A1 | 4/2014 | Utsch et al. |
| 2014/0163443 A1 | 6/2014 | Young et al. |
| 2014/0180331 A1 | 6/2014 | Turner |
| 2014/0190023 A1 | 7/2014 | Vitantonio et al. |
| 2014/0194900 A1 | 7/2014 | Sedic |
| 2014/0200495 A1 | 7/2014 | Jones |
| 2014/0207032 A1 | 7/2014 | Dematio et al. |
| 2014/0209594 A1 | 7/2014 | Besner |
| 2014/0221887 A1 | 8/2014 | Wu |
| 2014/0288473 A1 | 9/2014 | Matsushita |
| 2014/0305747 A1 | 10/2014 | Kumar et al. |
| 2014/0310900 A1 | 10/2014 | Curry et al. |
| 2014/0316313 A1 | 10/2014 | Mayer et al. |
| 2015/0005682 A1 | 1/2015 | Danby et al. |
| 2015/0042254 A1 | 2/2015 | Kato |
| 2015/0082562 A1 | 3/2015 | Kamada |
| 2015/0098184 A1 | 4/2015 | Tsai et al. |
| 2015/0119771 A1 | 4/2015 | Roberts |
| 2015/0133833 A1 | 5/2015 | Bradley et al. |
| 2015/0145297 A1 | 5/2015 | Lee |
| 2015/0148592 A1 | 5/2015 | Kanbar et al. |
| 2015/0157528 A1 | 6/2015 | Le et al. |
| 2015/0176674 A1 | 6/2015 | Khan et al. |
| 2015/0216719 A1 | 8/2015 | DeBenedictis et al. |
| 2015/0217142 A1 | 8/2015 | Schafer |
| 2015/0257964 A1 | 9/2015 | Ajiki |
| 2015/0305969 A1 | 10/2015 | Giraud et al. |
| 2015/0328081 A1 | 11/2015 | Goldenberg et al. |
| 2015/0359704 A1* | 12/2015 | Imboden ............... H02J 50/12 601/72 |
| 2015/0375315 A1 | 12/2015 | Ukai et al. |
| 2016/0000642 A1 | 1/2016 | Zipper |
| 2016/0017905 A1 | 1/2016 | Cascolan et al. |
| 2016/0030279 A1 | 2/2016 | Driscoll et al. |
| 2016/0045661 A1 | 2/2016 | Gray et al. |
| 2016/0112841 A1 | 4/2016 | Holland |
| 2016/0113840 A1 | 4/2016 | Crunick et al. |
| 2016/0113841 A1 | 4/2016 | Godfrey et al. |
| 2016/0127129 A1 | 5/2016 | Chee et al. |
| 2016/0129186 A1 | 5/2016 | Douglas et al. |
| 2016/0136037 A1 | 5/2016 | Cai |
| 2016/0136040 A1 | 5/2016 | Li |
| 2016/0166464 A1 | 6/2016 | Douglas et al. |
| 2016/0166833 A1* | 6/2016 | Oh ............... A61H 19/40 607/3 |
| 2016/0170996 A1 | 6/2016 | Frank et al. |
| 2016/0192814 A1 | 7/2016 | Kang et al. |
| 2016/0206502 A1 | 7/2016 | Køltzow |
| 2016/0243359 A1 | 8/2016 | Sharma |
| 2016/0263732 A1 | 9/2016 | Lourenco et al. |
| 2016/0269486 A1 | 9/2016 | Gupta et al. |

(56) References Cited

U.S. PATENT DOCUMENTS

| | | | |
|---|---|---|---|
| 2016/0310353 A1 | 10/2016 | Barasch | |
| 2016/0311091 A1 | 10/2016 | Wang | |
| 2016/0324717 A1 | 11/2016 | Burton | |
| 2016/0331308 A1* | 11/2016 | Zhou | A61M 35/003 |
| 2016/0338901 A1 | 11/2016 | Cohen | |
| 2016/0346163 A1 | 12/2016 | Konik et al. | |
| 2016/0367425 A1 | 12/2016 | Wersland | |
| 2017/0027798 A1 | 2/2017 | Wersland | |
| 2017/0042754 A1 | 2/2017 | Fowers et al. | |
| 2017/0049278 A1 | 2/2017 | Thomassen | |
| 2017/0069191 A1 | 3/2017 | Erkkila | |
| 2017/0119623 A1 | 5/2017 | Attarian | |
| 2017/0128320 A1 | 5/2017 | Chen | |
| 2017/0156974 A1 | 6/2017 | Griner | |
| 2017/0156975 A1 | 6/2017 | Mills | |
| 2017/0189227 A1 | 7/2017 | Brunson et al. | |
| 2017/0216136 A1 | 8/2017 | Gordon | |
| 2017/0233063 A1 | 8/2017 | Zhao et al. | |
| 2017/0246074 A1 | 8/2017 | Wu | |
| 2017/0304144 A1 | 10/2017 | Tucker | |
| 2017/0304145 A1 | 10/2017 | Pepe | |
| 2017/0312161 A1 | 11/2017 | Johnson et al. | |
| 2017/0360641 A1 | 12/2017 | Nakata et al. | |
| 2018/0008512 A1 | 1/2018 | Goldstein | |
| 2018/0033437 A1* | 2/2018 | Inada | G06F 3/167 |
| 2018/0039478 A1* | 2/2018 | Sung | G10L 15/1815 |
| 2018/0050440 A1 | 2/2018 | Chen | |
| 2018/0078449 A1 | 3/2018 | Callow | |
| 2018/0133101 A1 | 5/2018 | Inada | |
| 2018/0140100 A1 | 5/2018 | Cribbs | |
| 2018/0140502 A1 | 5/2018 | Shahoian et al. | |
| 2018/0141188 A1 | 5/2018 | Lai | |
| 2018/0154141 A1 | 6/2018 | Ahn | |
| 2018/0185234 A1 | 7/2018 | Ishiguro et al. | |
| 2018/0200141 A1 | 7/2018 | Wersland et al. | |
| 2018/0236572 A1 | 8/2018 | Ukai | |
| 2018/0243158 A1 | 8/2018 | Loghmani et al. | |
| 2018/0263845 A1 | 9/2018 | Wersland et al. | |
| 2018/0279843 A1 | 10/2018 | Paul et al. | |
| 2018/0288160 A1 | 10/2018 | Paul et al. | |
| 2018/0296433 A1 | 10/2018 | Danby et al. | |
| 2018/0315499 A1 | 11/2018 | Appelbaum et al. | |
| 2018/0315504 A1 | 11/2018 | Inada et al. | |
| 2019/0000709 A1 | 1/2019 | Sone et al. | |
| 2019/0021929 A1* | 1/2019 | Einav | A63B 21/00181 |
| 2019/0038229 A1 | 2/2019 | Perraut et al. | |
| 2019/0066833 A1 | 2/2019 | Wicki | |
| 2019/0110945 A1 | 4/2019 | Kawagoe et al. | |
| 2019/0175434 A1 | 6/2019 | Zhang | |
| 2019/0209424 A1 | 7/2019 | Wersland et al. | |
| 2019/0216677 A1 | 7/2019 | Paul | |
| 2019/0232478 A1 | 8/2019 | Zawisza et al. | |
| 2019/0254921 A1 | 8/2019 | Marton et al. | |
| 2019/0254922 A1 | 8/2019 | Marton et al. | |
| 2019/0314239 A1 | 10/2019 | Ci | |
| 2019/0337140 A1 | 11/2019 | Shanklin | |
| 2019/0350793 A1 | 11/2019 | Wersland et al. | |
| 2019/0371136 A1* | 12/2019 | Whitaker | A61M 5/422 |
| 2019/0381271 A1 | 12/2019 | Jo | |
| 2020/0000237 A1 | 1/2020 | Wu | |
| 2020/0009010 A1 | 1/2020 | Park et al. | |
| 2020/0016027 A1 | 1/2020 | Kim et al. | |
| 2020/0035237 A1 | 1/2020 | Kim et al. | |
| 2020/0069510 A1 | 3/2020 | Wersland et al. | |
| 2020/0085675 A1 | 3/2020 | Lee et al. | |
| 2020/0090175 A1 | 3/2020 | Davis et al. | |
| 2020/0179210 A1 | 6/2020 | Barragan Gomez | |
| 2020/0179215 A1 | 6/2020 | Lerner | |
| 2020/0230012 A1 | 7/2020 | Fuhr | |
| 2020/0241683 A1 | 7/2020 | Le et al. | |
| 2020/0261306 A1 | 8/2020 | Pepe | |
| 2020/0261307 A1 | 8/2020 | Wersland et al. | |
| 2020/0268594 A1 | 8/2020 | Pepe | |
| 2020/0294423 A1 | 9/2020 | Blain et al. | |
| 2020/0352821 A1 | 11/2020 | Wersland et al. | |
| 2020/0357046 A1* | 11/2020 | McGann | A61H 23/02 |
| 2020/0390644 A1 | 12/2020 | Yang | |
| 2020/0397651 A1 | 12/2020 | Park et al. | |
| 2020/0405570 A1 | 12/2020 | Kodama | |
| 2021/0000683 A1 | 1/2021 | Cheng | |
| 2021/0022951 A1 | 1/2021 | Hu | |
| 2021/0022955 A1 | 1/2021 | Wersland et al. | |
| 2021/0059898 A1 | 3/2021 | Wersland et al. | |
| 2021/0085555 A1 | 3/2021 | Davis et al. | |
| 2021/0128402 A1 | 5/2021 | Dai et al. | |
| 2021/0137777 A1* | 5/2021 | Bennett | A61H 39/04 |
| 2021/0244610 A1* | 8/2021 | Wersland | A61H 23/006 |
| 2021/0244611 A1 | 8/2021 | Wersland et al. | |
| 2021/0330539 A1 | 10/2021 | Faussett | |
| 2022/0000781 A9 | 1/2022 | Leneweit et al. | |
| 2022/0007810 A1 | 1/2022 | Paspatis et al. | |
| 2022/0023141 A1* | 1/2022 | Buc | A61H 23/0254 |
| 2022/0054347 A1* | 2/2022 | Tan | G10L 15/22 |
| 2022/0054350 A1 | 2/2022 | Merino et al. | |
| 2022/0087433 A1 | 3/2022 | Mao et al. | |
| 2022/0241135 A1 | 8/2022 | Wang | |
| 2022/0257460 A1* | 8/2022 | Wersland | A61H 1/006 |
| 2022/0323290 A1* | 10/2022 | Sloan | G10L 25/63 |
| 2023/0001131 A1 | 1/2023 | English et al. | |

FOREIGN PATENT DOCUMENTS

| | | |
|---|---|---|
| CN | 86101310 A | 9/1986 |
| CN | 1432452 A | 7/2003 |
| CN | 2788807 Y | 6/2006 |
| CN | 201239336 Y | 5/2009 |
| CN | 201239338 Y | 5/2009 |
| CN | 201333160 Y | 10/2009 |
| CN | 201524220 U | 7/2010 |
| CN | 101888050 A | 11/2010 |
| CN | 201743890 U | 2/2011 |
| CN | 201847899 U | 6/2011 |
| CN | 301664182 S | 9/2011 |
| CN | 202161539 U | 3/2012 |
| CN | 202637439 U | 1/2013 |
| CN | 103648320 A | 3/2014 |
| CN | 203598194 U | 5/2014 |
| CN | 104352341 A | 2/2015 |
| CN | 303250924 S | 6/2015 |
| CN | 303250929 S | 6/2015 |
| CN | 205163583 U | 4/2016 |
| CN | 104352341 B | 7/2016 |
| CN | 205459750 U | 8/2016 |
| CN | 205494357 U | 8/2016 |
| CN | 205598186 U | 9/2016 |
| CN | 106074129 A | 11/2016 |
| CN | 106236528 A | 12/2016 |
| CN | 206081000 U | 4/2017 |
| CN | 106859949 A | 6/2017 |
| CN | 304561844 S | 3/2018 |
| CN | 207286298 U | 5/2018 |
| CN | 207855923 U | 9/2018 |
| CN | 109259995 A | 1/2019 |
| CN | 208405314 U | 1/2019 |
| CN | 208448086 U | 2/2019 |
| CN | 109528473 A | 3/2019 |
| CN | 209154392 U | 7/2019 |
| CN | 110868983 A | 3/2020 |
| CN | 106618998 B | 8/2020 |
| CN | 111616938 A | 9/2020 |
| CN | 111973419 A | 11/2020 |
| CN | 113143721 A | 7/2021 |
| CN | 113509366 A | 10/2021 |
| DE | 3633888 A1 | 4/1988 |
| DE | 19905199 A1 | 7/2000 |
| DE | 102015102112 A1 | 8/2015 |
| DE | 202015005257 U1 | 10/2016 |
| EP | 0436719 B1 | 5/1994 |
| EP | 1728494 A1 | 12/2006 |
| EP | 2080500 A1 | 7/2009 |
| EP | 2328255 A1 | 6/2011 |
| EP | 1728494 B1 | 1/2013 |
| GB | 2066081 A | 7/1981 |
| GB | 2262236 A | 6/1993 |

(56) References Cited

FOREIGN PATENT DOCUMENTS

| | | |
|---|---|---|
| JP | S5230553 A | 3/1977 |
| JP | S5428491 A | 3/1979 |
| JP | H0219157 A | 1/1990 |
| JP | H03218763 A | 9/1991 |
| JP | H048128 B2 | 2/1992 |
| JP | H0447440 A | 2/1992 |
| JP | H0447440 U | 4/1992 |
| JP | H0751393 A | 2/1995 |
| JP | 2000189525 A | 7/2000 |
| JP | 3077837 U | 6/2001 |
| JP | 2002282322 A | 10/2002 |
| JP | 2003077837 A | 3/2003 |
| JP | 2005204777 A | 8/2005 |
| JP | 2006034941 A | 2/2006 |
| JP | 2006212228 A | 8/2006 |
| JP | 2008510588 A | 4/2008 |
| JP | 2008289616 A | 12/2008 |
| JP | 2010534110 A | 11/2010 |
| JP | 2011502369 A | 1/2011 |
| JP | 5129032 B2 | 1/2013 |
| JP | 2013119018 A | 6/2013 |
| JP | 2014511240 A | 5/2014 |
| JP | 2015035844 A | 2/2015 |
| JP | 2015104422 A | 6/2015 |
| JP | 2018518347 A | 7/2018 |
| KR | 200313149 Y1 | 5/2003 |
| KR | 200435552 Y1 | 1/2007 |
| KR | 100752432 B1 | 8/2007 |
| KR | 20090119424 A | 11/2009 |
| KR | 101123926 B1 | 4/2012 |
| KR | 101162978 B1 | 7/2012 |
| KR | 101406275 B1 | 6/2014 |
| KR | 20170106550 A | 9/2017 |
| KR | 20170108550 A | 9/2017 |
| KR | 20180031683 A | 3/2018 |
| KR | 20200051098 A | 5/2020 |
| RU | 2170567 C1 | 7/2001 |
| TW | 1359657 B | 3/2012 |
| TW | 201440753 A | 11/2014 |
| WO | WO-0119316 A2 | 3/2001 |
| WO | WO-2009014727 A1 | 1/2009 |
| WO | WO-2009102279 A1 | 8/2009 |
| WO | WO-2011159317 A1 | 12/2011 |
| WO | WO-2013114084 A1 | 8/2013 |
| WO | WO-2013145346 A1 | 10/2013 |
| WO | WO-2014118596 A1 | 8/2014 |
| WO | WO-2015038005 A2 | 3/2015 |
| WO | WO-2018012105 A1 | 1/2018 |
| WO | WO-2019186225 A1 | 10/2019 |
| WO | WO-2021050861 A1 | 3/2021 |
| WO | WO-2023172676 A2 | 9/2023 |

OTHER PUBLICATIONS

Amazon: "PowerA Joy Con & Pro Controller Charging Dock Nintendo Switch," PowerA, Oct. 31, 2017, Especially annotated figures, Retrieved from Entire Document, 10 Pages.

Amazon: "Theragun G3PRO Percussive Therapy Device, White, Handheld Deep Muscle, Treatment Massager & Muscle Stimulator for Pain Relief, Recovery, Enhance Performance & Energize The Body," Feb. 13, 2019, Shown on pp. 1, 2 Pages, Retrieved from URL: https://www.amazon.com/dp/B07MJ2MCT3/ref=nav_timeline_asin?_encoding=UTF8&psc=1.

Anthony Katz, "The Raptor: Helps Patients and Saves Your Most Valuable Tool . . . Your Hands," DC Aligned:MeyerDC, Dec. 9, 2015, available at: http://news.meyerdc.com/community/vendor-spotlight/the-raptor-helps-patients-saves-your-most-valuable-tool-your-hands/ (last visited Feb. 15, 2023); 5 pages.

Bardwell D., "Wahl's Massage Products—Meant for Life's Big Pains," DougBardwell.com, Apr. 6, 2016, 7 Pages, [Retrieved on Jun. 3, 2021] Retrieved from URL: https://dougbardwell.com/db/2016/04/06/wahls-massage-products-meant-for-lifes-big-pains/.

Collins D., "External Rotor Motor Basics: Design and Applications," Jun. 6, 2018, 03 Pages.

Collins D., "Faq: What are Hall Effect Sensors and What Is Theirs Role In Dc Motors?," Jan. 11, 2017, 03 Pages.

Defendant's Initial Invalidity Contentions, *Therabody, Inc.* v. *Tzumi Electronics LLC et al.*, Case No. SDNY-1-21-cv-07803 (PGG)(RWL), dated Aug. 17, 2022; 16 pages.

Description of Therabody GI Device, available at: https://www.therabody.com/US/en-us/faq/thearagun-devices/faq-devices-1.html?fdid=faq&csortb1=sortOrder&csortd1=1 (last visited Feb. 15, 2023).

Digi-Key's North American Editors: "How to Power and Control Brushless DC Motors," Dec. 7, 2016, 09 Pages.

Examination Report For Australian Patent Application No. 2016284030, dated May 7, 2018, 3 Pages.

Extended European Search Report for European Application No. 16815104.1, mailed Jan. 23, 2019, 08 Pages.

Extended European Search Report for European Application No. 18832213.5, mailed Jul. 21, 2021, 11 Pages.

Extended European Search Report for European Application No. 18832923.9, mailed Apr. 23, 2021, 7 Pages.

Extended European Search Report for European Application No. 20720323.3, mailed Sep. 9, 2021, 10 Pages.

Extended European Search Report for European Application No. 20802710.2, mailed May 10, 2022, 9 Pages.

Extended European Search Report for European Application No. 20802804.3, mailed Apr. 28, 2022, 8 Pages.

Extended European Search Report for European Application No. 21178300.6, mailed Oct. 19, 2021, 9 Pages.

Extended European Search Report for European Application No. 21178311.3, mailed Sep. 23, 2021, 5 Pages.

Holly Riddle, "Theragun vs. Hyperice vs, Hydragun: Massage Gun Showdown [Buyer's Guide]," ChatterSource: Health & Wellness, Mar. 9, 2021, available at: https://www.chattersource.com/article/massage-gun/ (last visited Feb. 17, 2023); 14 pages.

International Preliminary Report on Patentability for International Application No. PCT/US2016/038326, mailed Jan. 4, 2018, 8 Pages.

International Preliminary Report on Patentability for International Application No. PCT/US2018/022426, mailed Sep. 26, 2019, 9 Pages.

International Preliminary Report on Patentability for International Application No. PCT/US2018/039599, mailed Jan. 23, 2020, 8 Pages.

International Preliminary Report on Patentability for International Application No. PCT/US2018/040795, mailed Jan. 23, 2020, 7 Pages.

International Preliminary Report on Patentability for International Application No. PCT/US2019/067624, mailed Jul. 8, 2021, 11 Pages.

International Preliminary Report on Patentability for International Application No. PCT/US2020/017645, mailed Aug. 26, 2021, 11 Pages.

International Preliminary Report on Patentability for International Application No. PCT/US2020/031339, mailed Nov. 18, 2021, 11 Pages.

International Preliminary Report on Patentability for International Application No. PCT/US2020/031936, mailed Nov. 18, 2021, 14 Pages.

International Preliminary Report on Patentability for International Application No. PCT/US2020/050385, mailed Mar. 24, 2022, 12 Pages.

International Preliminary Report on Patentability for International Application No. PCT/US2020/050399, mailed Jan. 13, 2022, 6 Pages.

International Preliminary Report on Patentability for International Application No. PCT/US2020/054773, mailed Apr. 21, 2022, 8 Pages.

International Preliminary Report on Patentability for International Application No. PCT/US2020/054842, mailed Apr. 21, 2022, 7 Pages.

International Preliminary Report on Patentability for International Application No. PCT/US2020/063426, mailed Jun. 16, 2022, 06 Pages.

(56) References Cited

OTHER PUBLICATIONS

International Preliminary Report on Patentability for International Application No. PCT/US2021/022500, mailed Oct. 6, 2022, 6 Pages.
International Preliminary Report on Patentability for International Application No. PCT/US2021/029900, mailed Nov. 10, 2022, 9 Pages.
International Preliminary Report on Patentability for International Application No. PCT/US2021/029903, mailed Nov. 10, 2022, 7 Pages.
International Search Report and Written Opinion for International Application No. PCT/US2016/038326, mailed Sep. 1, 2016, 9 Pages.
International Search Report and Written Opinion for International Application No. PCT/US2018/022426, mailed May 31, 2018, 10 Pages.
International Search Report and Written Opinion for International Application No. PCT/US2018/039599, mailed Sep. 24, 2018, 9 Pages.
International Search Report and Written Opinion for International Application No. PCT/US2018/040795, mailed Sep. 24, 2018, 8 Pages.
International Search Report and Written Opinion for International Application No. PCT/US2019/067624, mailed Feb. 3, 2020, 13 Pages.
International Search Report and Written Opinion for International Application No. PCT/US2020/017645, mailed May 20, 2020, 13 Pages.
International Search Report and Written Opinion for International Application No. PCT/US2020/031339, mailed Jun. 10, 2020, 12 Pages.
International Search Report and Written Opinion for International Application No. PCT/US2020/031347, mailed Aug. 3, 2020, 9 Pages.
International Search Report and Written Opinion for International Application No. PCT/US2020/031936, mailed Sep. 11, 2020, 17 Pages.
International Search Report and Written Opinion for International Application No. PCT/US2020/050385, mailed Dec. 3, 2020, 13 Pages.
International Search Report and Written Opinion for International Application No. PCT/US2020/050399, mailed Feb. 4, 2021, 11 Pages.
International Search Report and Written Opinion for International Application No. PCT/US2020/054773, mailed Jan. 12, 2021, 9 Pages.
International Search Report and Written Opinion for International Application No. PCT/US2020/054842, mailed Jan. 11, 2021, 8 Pages.
International Search Report and Written Opinion for International Application No. PCT/US2020/063426, mailed Feb. 26, 2021, 09 Pages.
International Search Report and Written Opinion for International Application No. PCT/US2021/022500, mailed Apr. 20, 2021, 7 Pages.
International Search Report and Written Opinion for International Application No. PCT/US2021/029900, mailed Oct. 6, 2021, 12 Pages.
International Search Report and Written Opinion for International Application No. PCT/US2021/029903, mailed Jul. 28, 2021, 8 Pages.
International Search Report and Written Opinion for International Application No. PCT/US2022/028309, mailed Sep. 8, 2022, 10 Pages.
International Search Report and Written Opinion for International Application No. PCT/US2022/076238, mailed Jan. 23, 2023, 12 Pages.
Machine translation from Espacenet of written description and claims for CN106074129A, 9 pages (2016).
Machine translation from Espacenet of written description and claims for CN111616938A, 5 pages (2020).
Machine translation from Espacenet of written description and claims for CN111973419A, 7 pages (2020).
Machine Translation of Written Description and Claims for WO2013145346A1 (Year: 2013).
Massage Expert: "Nursal Deep Percussion Massager Review—6 Interchangeable Nodes," Jan. 4, 2021, 6 Pages, [Retrieved on Jun. 3, 2021] Retrieved from URL: https://www.massagexpert.net/nursal-deep-percussion-massager-review/.
McFarland M., "Segway Was Supposed to Change the World, Two Decades Later, It Just Might," CNN Wire Service, Oct. 30, 2018, 7 Pages.
Notice of Reasons for Rejection for Japanese Patent Application No. 2018-517683, dated Oct. 2, 2018, 10 Pages.
Office Action For Canadian Application No. 2,990,178, dated Oct. 15, 2018, 4 Pages.
Partial Supplementary European Search Report for European Application No. 18832213.5, mailed Apr. 20, 2021, 12 Pages.
Rachel [no family name indicated], "Jigsaw Massager," Instructables, Apr. 18, 2010, 6 Pages, Retrieved from URL: https://web.archive.org/web/20100418041422/ http://www.instructables.com/id/Jigsaw-Massager/.
Rockwell: "Trans4mer Operating Manual for Multi-purpose saw," Model RK2516/RK2516K, 2011, 32 Pages.
Supplementary European Search Report for European Application No. 19904459.5, mailed Apr. 15, 2021, 04 Pages.
TestberichtE.De: "Naipo Handheld Percussion Massager with Heating (MGPC 5000)," amazon.de, 7 Pages, [Retrieved on Jun. 3, 2021] Retrieved from URL: https://www.testberichte.de/p/naipo-tests/handheld-percussion-massager-with-heating-mgpc-5000-testbericht.html, See also a YouTube Review of this Device dated May 21, 2018 at https://www.youtube.com/watch?v=bi_QCJA3D9k.
Visual Description of Hyper Ice, Inc. Raptor Device, "Osteopatia Haidy Ortale—Raptor Massage," available at: https://www.youtube.com/watch?v=plyW8FBowVs (last visited Feb. 15, 2023); 1 page.
Visual Description of Hyper Ice, Inc. Raptor Device, "RAPTOR Solutions 1.3 Prone," available at: https://www.youtube.com/watch?v=6i1tRqdwPU8&t=156s (last visited Feb. 15, 2023); 1 page.
WORX: "Safety and Operating Manual Original Instructions," for 12V Li-Ion Multipurpose saw, WX540, WX540.3, WX540.9, Trans4mer, 2013, 16 Pages.
WORX Trans4mer "Safety and Operating Manual Original Instructions" for 12V Li-Ion Multipurpose saw, WX540, NX540.3, WX540.9, 16 pages (2013).
YouTube: "Unboxing: Joy-Con & Pro Controller Charging Dock for Nintendo Switch," Crusherbad64, Especially demonstration 8:30-8:55, (This reference is Being Used to Show Greater Details of Product not Clearly Disclosed in 'PowerA'), Feb. 26, 2018, Retrieved from entire document, 1 Page.

* cited by examiner

SYSTEMS, METHODS, AND DEVICES FOR PERCUSSIVE MASSAGE THERAPY WITH VOICE ACTIVATION

FIELD

Aspects of the present disclosure relate to massage devices, and particularly to components, systems, and methods for percussive massage therapy with voice activation features.

BACKGROUND

Massage devices often provide ineffective massages that are superficial without any real benefit to users. Thus, percussive massage devices have become increasingly popular amongst users for alleviating pain and providing therapeutic relief.

In some cases, new users may be uncomfortable using percussive massage devices with which they are unfamiliar or have not used before. It may be difficult for such users to change the functions or operations of the percussive massage device if they are inexperienced with using the device or if they are unable to reach the control buttons or touch screen on the device during operation (e.g., during a massage).

SUMMARY

Accordingly, there may be a need for providing new methods, devices, and/or systems that allow users to operate percussive massage devices using voice activation to enhance accessibility and ease of the device for users. Described herein is a percussive massage device that uses a microphone to receive voice commands or voice input from a user and a speaker to output audio to the user, including voice prompts, responses, or audio instructions. In some embodiments, the user may activate and control components of the percussive massage device by voice, such that the user may operate the device with ease and intuition. By providing voice recognition and voice control features to the percussive massage device, the overall user experience may be improved to benefit users and enhance the therapy experience.

In some embodiments, the microphone and/or speaker may be internal components or external components of the percussive therapy device and arranged within a housing of the percussive therapy device. In other embodiments, the microphone and/or speaker might not be housed within the percussive therapy device itself and may be an external microphone and/or speaker that is located in an external device (e.g., a mobile device, a smart speaker, or the like) that is communicatively coupled to the percussive therapy device.

In an embodiment, a percussive massage device including a housing, a motor, a switch, a microphone, a speaker, and a controller is described. The motor of the percussive massage device is positioned in the housing, and switch is configured to operate the motor. The controller of the percussive massage device includes at least one processor and a memory, and the controller is coupled to the switch, the microphone, and the speaker. The controller of the percussive massage device is configured to receive, from the microphone, a voice input of a user of the percussive massage device, perform, by the at least one processor, speech recognition of the voice input, determine, by the at least one processor, an audio output based on the speech recognition of the voice input, and transmit an audio signal to the speaker to transmit the audio output to the user of the percussive massage device.

In another embodiment, a percussive massage device including a housing, a motor positioned in the housing, a switch configured to operate the motor, and a controller is described. The controller includes at least one processor and a memory, and the controller is coupled to the switch, a microphone, and a speaker. The controller is configured to receive, from the microphone, a voice input of a user of the percussive massage device, perform, by the at least one processor, speech recognition of the voice input, determine, by the at least one processor, an audio output based on the speech recognition of the voice input, and transmit an audio signal to the speaker to transmit the audio output to the user of the percussive massage device.

In another embodiment, an example method of use is described. The method includes obtaining a percussive massage device comprising a housing, a motor positioned in the housing, a switch configured to operate the motor, a microphone, a speaker, and a controller, wherein the controller is coupled to the switch, the microphone, and the speaker, wherein the housing includes first, second, and third handle portions arranged to define a handle opening, and wherein the microphone and the speaker are housed in at least one of the first, second, and third handle portions. The method further includes providing a voice input to the microphone of the percussive massage device, wherein the speaker of the percussive massage device is configured to transmit an audio output and perform an action in response to the voice input, and grasping the first, second, or third handle portions and massaging a body part during or after the percussive massage device performs the action.

In another embodiment, another example method is described. The method includes receiving, at a microphone of a percussive massage device, a voice input from a user of the percussive massage device. The percussive massage device includes a housing, a motor positioned in the housing, a switch configured to operate the motor, the microphone, a speaker, and a controller, in which the controller is coupled to the switch, the microphone, and the speaker. The method further includes performing, by the controller, speech recognition of the voice input, determining, by the controller, an audio output based on the speech recognition of the voice input, and transmitting an audio signal to the speaker to transmit the audio output to the user of the percussive massage device.

Further features and advantages, as well as the structure and operation of various embodiments, are described in detail below with reference to the accompanying drawings. It is noted that the specific embodiments described herein are not intended to be limiting. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the disclosure.

Figure 1:
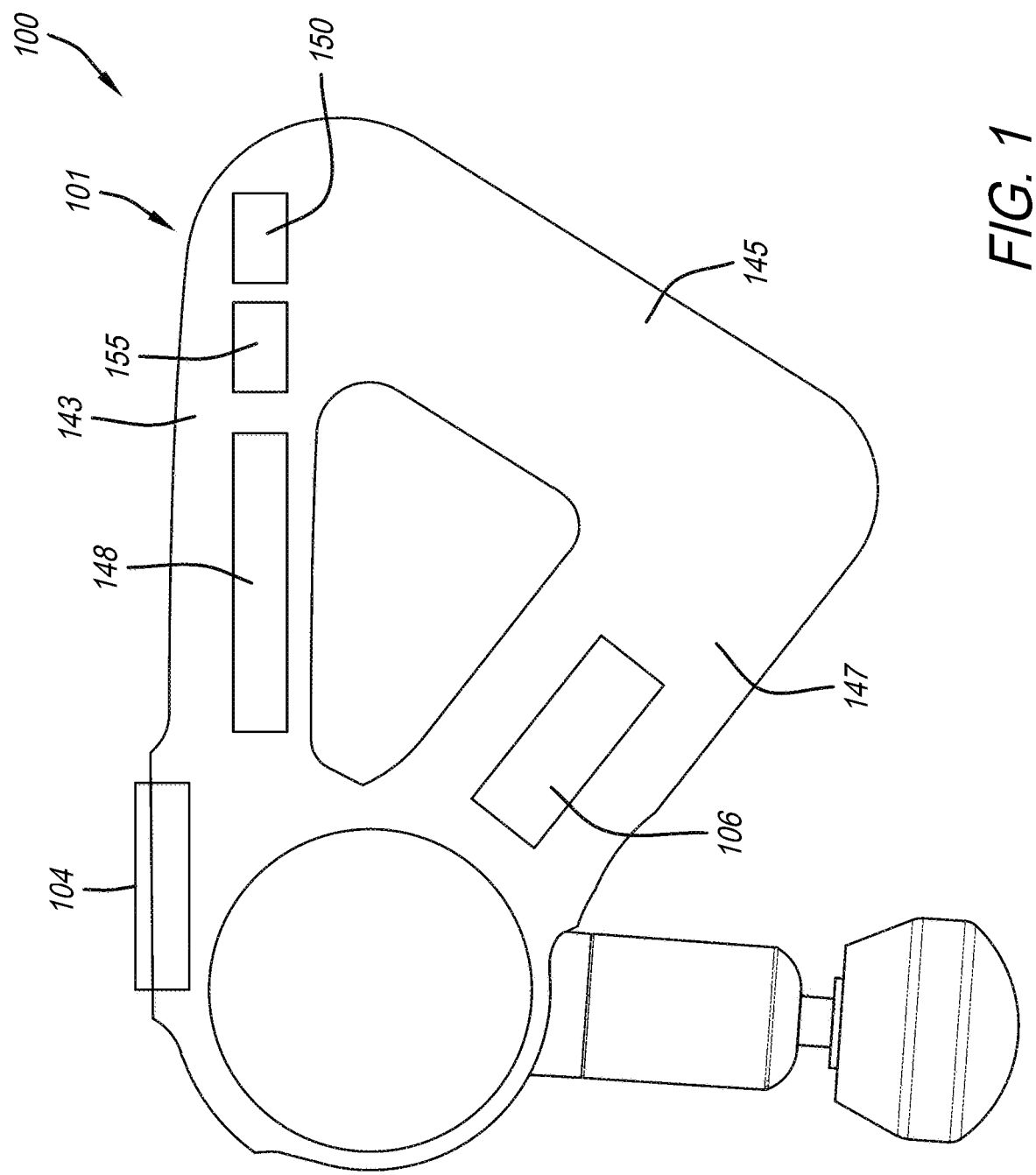
FIG. 1 illustrates an example diagram of a percussive massage device with voice activation, according to embodiments of the present disclosure.

Embodiments of the present disclosure will be described with reference to the accompanying drawings.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment might not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, or hardware (such as one or more of a circuit, microchip, and device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Aspects of the present disclosure are directed to a percussive massage device with voice activation features. The percussive massage device may utilize voice activation components that may be attached thereto or housed within the percussive massage device, or externally coupled to the percussive massage device through an external device. In some embodiments, the voice activation components may include a microphone and a speaker. The voice activation features described herein may be used with the percussive massage devices disclosed in U.S. Patent Publication No. 2021/0244611 ("the '611 publication"), which is a publication of U.S. application Ser. No. 17/244,278, filed Apr. 29, 2021, U.S. Patent Publication No. 2021/0022955 ("the '955 publication"), which is a publication of U.S. application Ser. No. 17/066,230, filed Oct. 8, 2020, and U.S. Patent Publication No. 2020/0352821 ("the '821 publication"), which is a publication of U.S. application Ser. No. 16/824,328, filed Mar. 19, 2020, the disclosures of which are each incorporated by reference herein in their entireties.

It will be appreciated that the terms percussive massage device and percussive therapy device may be used interchangeably throughout. The terms are synonymous and generally have the same meaning. Commercial embodiments of the applicant's devices are generally being called percussive therapy devices in the market and therefore this term is used therein.

FIG. 1 illustrates an example diagram of a percussive massage device 100 with voice activation, according to embodiments of the present disclosure. The percussive massage device 100 includes a housing 101, a motor 106 positioned in the housing 101, a switch 104 configured to operate the motor 106, a microphone 150, a speaker 155, and a controller 148. The percussive massage device 100 may include similar features as the percussive massage devices disclosed in the '611 publication, the '955 publication, and/or the '821 publication.

The housing 101 of the percussive massage device 100 includes three handle portions, referred to herein as a first handle portion 143, a second handle portion 145, and a third handle portion 147. The first, second, and third handle portions 143, 145, and 147 may be arranged to define a handle opening. The first, second, and third handle portions 143, 145, and 147 may each define a corresponding axis, in each the three axes cooperate to form a triangle, as shown in FIG. 1.

The motor 106 may be connected to a reciprocating shaft or push rod assembly that is configured to reciprocate in response to activation of the motor. An attachment may be operatively connected to a distal end of the reciprocating shaft or push rod assembly and configured to provide a therapeutic effect to a user.

The switch 104 may be configured to operate the motor 106. In some embodiments, the switch 104 may be configured to turn on and turn off the percussive massage device 100 and control delivery of power to the motor 106. The switch 104 may be an electrical switch configured to allow passage of electric current when activated. In some embodiments, the switch 104 is a binary on/off switch. In another embodiment, the switch 104 is a variable switch. A variable switch controls the amount of power delivered to the motor 106. A relatively high amount of power delivered to the motor 106 by the variable switch 104 results in an increased speed of the motor 106. A relatively low amount of power delivered to the motor 106 by the variable switch 104 results in a decreased speed of the motor 106. In some embodiments, the variable switch 104 includes a variable resistor that allows a progressively increased amount of power to flow to the motor 106 in response to a progressively increasing activation of that switch 104.

The controller 148 may comprise a microcontroller unit (MCU) that is configured to control the functions of the percussive massage device 100, including the voice activation features. In some embodiments, the controller 148 may include at least one processor and a memory. In some embodiments, the memory of the controller 148 may be configured to store machine-readable code for processing by the at least one processor. Various other configurations may exist depending on whether the designer of the percussive massage device 100 desires to implement the machine-readable code in software, firmware, or both. In some embodiments, the machine-readable code is stored on the memory and configured to be executed by at least one processor of the controller 148. In some embodiments, the machine-readable code is stored on non-transitory computer-readable media.

The controller 148 may be communicatively coupled to motor 106, the switch 104, the microphone 150, the speaker 155, and other components or control units within the housing 101 of the percussive massage device 100. In some embodiments, the controller 148 may also be communicatively coupled with one or more external devices, such as a personal digital assistant, desktop workstation, laptop or notebook computer, netbook, tablet, smart phone, mobile phone, smart watch or other wearable, or any combination thereof. The controller 148 may be configured to communicate with external devices through one or more of the Internet, cable networks, cellular networks, wireless networks (e.g., Bluetooth, Wi-Fi, cellular, etc.) and wired networks. In some embodiments, the percussive massage device 100 may include a network interface that allows the device 100 to communicate with other devices through Bluetooth, Wi-Fi, cellular, and/or the like. In some embodiments, the network interface may comprise a wireless card, a hardware component, or the like, that is configured to allow the percussive massage device 100 to communicate wirelessly over a network with various other devices.

In some embodiments, the controller 148 may include input/output peripherals. In some embodiments, the microphone 150 and the speaker 155 shown in FIG. 1 may be considered to be components of the input/output peripherals of the controller 148.

The microphone 150 may be configured to receive audio from a user of the percussive massage device 100. In some embodiments, the user of the percussive massage device 100 may provide a voice input using the microphone 150 to control or operate the percussive massage device 100. In some embodiments, the voice input may include one or more voice commands from a user requesting the percussive massage device 100 to perform a specific action or requesting for information or recommendations. For example, a user may provide voice commands such as requesting to power on and/or power off the percussive massage device 100, set up or change a speed of the motor 106 (e.g., accelerate or decelerate), set a predetermined period of time for operating the motor 106, or the like. In some embodiments, the user of the percussive massage device 100 may provide a voice input to the percussive massage device 100 requesting for information or recommendations regarding different treatment protocols or routines associated with the percussive massage device 100, which attachment to use with the percussive massage device 100 (e.g., cone, ball, dampener, etc.), which body part to treat, and the like.

The microphone 150 may receive the voice input and transmit the audio from the voice input to the controller 148 for processing, including conversion, speech recognition, and natural language processing. In some embodiments, the voice input from the user may be in any language, such as English, German, French, or any other language preferred by the user. After receiving the voice input from the microphone 150, the controller 148 may process/convert the voice input and perform speech recognition and/or natural language processing of the audio from the voice input. The controller 148 may then determine an audio output based on the speech recognition and/or natural language processing of the audio from the voice input.

The speaker 155 may be configured to receive one or more audio signals from the controller 148 to transmit the audio output. The speaker 155 may transmit the audio output accordingly to the user of the percussive massage device 100. In some embodiments, the audio output may include one or more audio instructions to a user of the percussive massage device 100, in which the audio instructions provide guidance or step-by-step instructions on how to use or operate the percussive massage device 100. In some embodiments, the controller 148 may generate a customized recommendation for use of the percussive massage device 100 based on a predetermined level of pain and a length of time associated with the pain, via user input such as indicated by the user in a voice input or via other input provided to percussive massage device 100. The controller 148 may transmit one or more audio signals to the speaker 155 to transmit the audio output with the customized recommendation In some embodiments, the customized recommendation in the audio output may include one or more instructions for attachment(s) for the user to use, instructions on how to use the attachment(s) and device 100, and a recommendation on the length of time for use of the attachment(s) coupled to the device 100. In some embodiments, the customized recommendation in the audio output may be based on third-party data collected by a recommendation engine coupled to the controller 148, as described further in the '955 publication, the disclosure of which is incorporated by reference herein in its entirety. U.S. Patent Publication No. US2022/0265507A1, which is a publication of U.S. application Ser. No. 17/678,924, filed Feb. 23, 2022, describes generating and providing recommendations and is incorporated by reference herein in its entirety.

While the microphone 150 and the speaker 155 are shown located between the first and second handle portions 143 and 145 of the housing 101 in FIG. 1, the microphone 150 and the speaker 155 may be positioned in any location within the housing 101. In some embodiments, the microphone 150 and the speaker 155 may be located near the motor head area of the percussive massage device 100.

In some embodiments, the microphone 150 and the speaker 155 may be implemented as a voice-activated speaker or a smart speaker in the percussive massage device 100. In some embodiments, the microphone 150, the speaker 155, and the controller 148 may use voice recognition to accept one or more voice commands from a user of the percussive massage device 100 and execute them accordingly in the percussive massage device 100. In some embodiments, the controller 148 may determine an action for the percussive massage device 100 to perform based on the voice recognition and/or speech recognition of the voice input from the user and transmit one or more control signals to components in the percussive massage device 100 to operate the percussive massage device 100 according to the determined action. In some embodiments, the determined action may include at least one of powering on/off the percussive massage device 100, changing or setting a speed of the motor 106, setting a predetermined period of time for operating the motor 106, and the like.

In some embodiments, a user may operate the voice activation features of the percussive massage device 100 by obtaining the percussive massage device 100, providing a voice input to the microphone 150 of the percussive massage device 100, in which the speaker 155 of the percussive massage device 100 is configured to transmit an audio output and the percussive massage device 100 performs an action in response to the voice input. The user may then grasp the first, second, or third handle portions 143, 145, 147 and massage a body part during or after the percussive massage device 100 performs the action.

By providing voice-activated commands to the percussive massage device 100, the user may operate the device with ease without having to reach for specific control buttons or switches on the device itself. The voice activation and voice control features in the percussive massage device 100 may be particularly advantageous to the user when using the device to massage areas of the body that can be hard to reach (e.g., back, shoulders, limbs, etc.).

Figure 2:
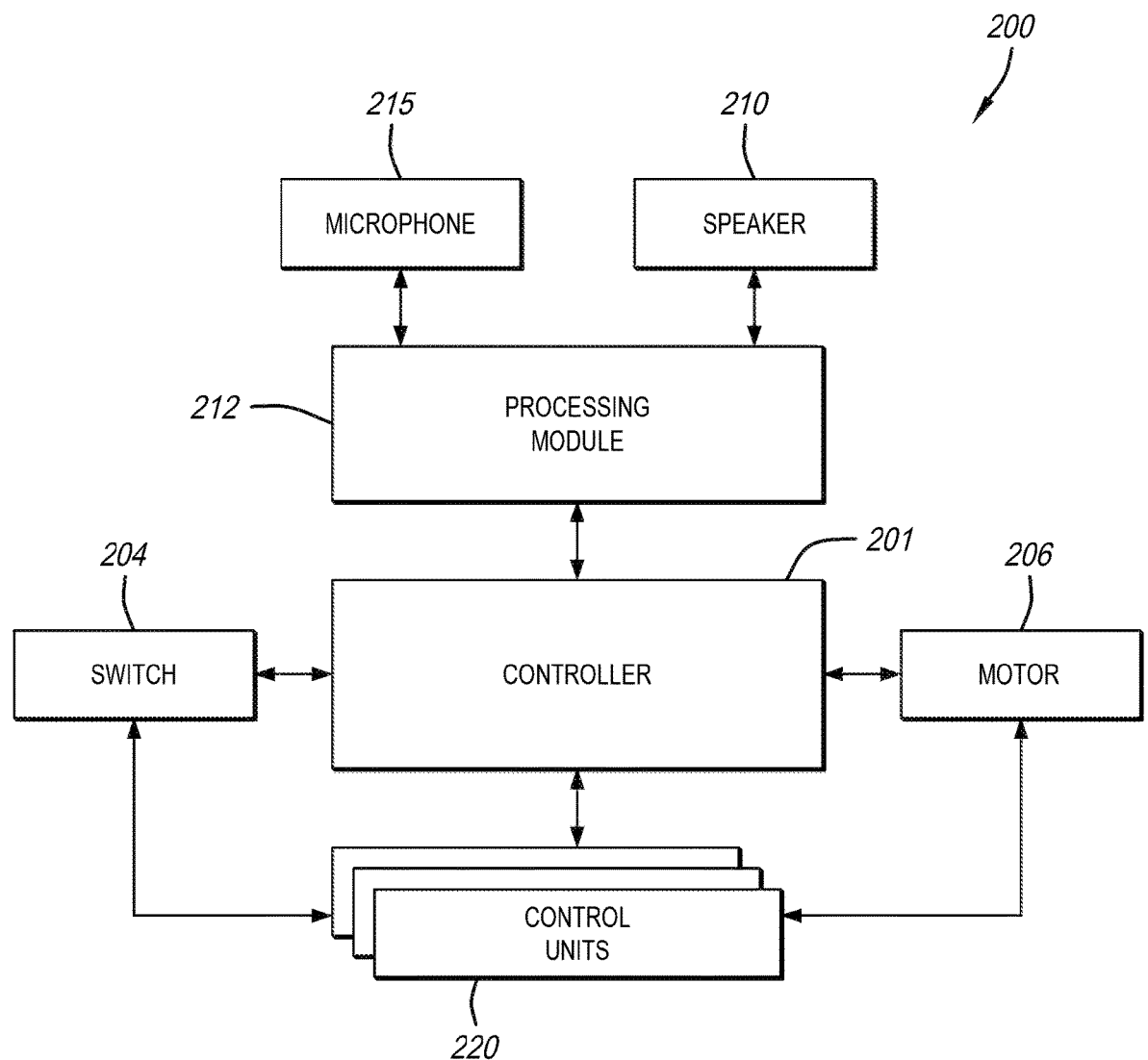
FIG. 2 illustrates an example block diagram showing interconnected components of a percussive massage device with voice activation, according to embodiments of the present disclosure.

FIG. 2 illustrates an example block diagram showing interconnected components of a percussive massage device 200 with voice activation, according to embodiments of the present disclosure. Percussive massage device 200 represents an exemplary embodiment of percussive massage device 100 in FIG. 1.

Percussive massage device 200 includes controller 201, switch 204, motor 206, speaker 210, processing module 212, microphone 215, and one or control units 220. Controller 201, switch 204, motor 206, speaker 210, and microphone 215 may represent exemplary embodiments of controller 148, switch 104, motor 106, speaker 155, and microphone 150, respectively, in FIG. 1.

The controller 201 may be configured to provide one or more signals and/or communicate with each of the components in the percussive massage device 200, including the switch 204, motor 206, speaker 210, processing module 212, microphone 215, and one or control units 220.

In some embodiments, the one or more control units 220 may include at least one of an OLED (Organic Light Emitting Diodes) screen control unit, a wireless control unit, a motor drive unit, a pulse-width modulation (PWM) speed setup unit, a wireless control unit, a battery pack control unit, and a power or voltage control unit. In some embodiments, the one or more control units 220 may include additional functionality, components, units, and/or systems that are coupled to the controller (e.g., MCU) as described further in the '611 publication.

In some embodiments, the controller 201 may be coupled to a processing module 212. The processing module 212 may include one or more engines or modules that are configured to process and convert the audio from voice inputs received by microphone 215, perform speech recognition, and determine an audio output based on the speech recognition. In some embodiments, the processing module 212 may include a speech recognition module and natural language processing module configured to perform speech recognition and natural language processing, respectively, of voice inputs received from the microphone 215.

In some embodiments, the speech recognition and natural language processing modules (e.g., processing module 212) may utilize one or more machine learning algorithms including but not limited to probabilistic models, neural networks, frequency estimation, hidden Markov models, Gaussian mixture models, pattern matching algorithms, neural networks, matrix representation, Vector Quantization, or decision trees. The processing modules may utilize a machine learning algorithm to improve the accuracy of the speech recognition of received audio inputs, such as by training a machine learning model on a dataset of audio commands. In some embodiments, there may be additional steps to improve the accuracy of the model's output. For example, this may include using context information, such as the current state of the percussive massage device 100 or the user's previous commands, to help the model better understand the intended meaning of the voice commands. The use of machine learning may be particularly important for devices that perform speech recognition during actions that cause percussive massage device 100 to operate at a high volume or vibration that would make it more difficult to accurately capture audio. One example is when a user attempts to switch between different modes or settings while the percussive massage device 100 is in use. In some embodiments, the high volume or vibration of an action could interfere with microphone 215 capturing user audio. Utilizing machine learning and context information (e.g., massage intensity, massage settings) can increase the accuracy of speech recognition during these actions.

In some embodiments, the processing module 212 may perform speech recognition of the voice input by converting audio from the voice input to computer-readable text using one or more speech recognition models. The one or more speech recognition models may be stored in processing module 212 and/or in a memory of the controller 201. In some embodiments, the controller 201 may use the one or more speech recognition models and/or the code stored in the processing module 212 to perform the conversion, processing, and speech recognition steps of the voice input.

The processing module 212 may then determine the audio output by processing the computer-readable text to identify one or more words using one or more natural language processing models. The processing module 212 may then generate the audio output in response to the voice input using the one or more natural language processing models. In some embodiments, the one or more natural language processing models may be stored in processing module 212 and/or the memory of the controller 148, 201. In some embodiments, the controller 201 may use the one or more natural language processing models and/or the code stored in the processing module 212 to perform the word/voice command identification, the natural language processing, and audio generation steps for determining the audio output.

In some embodiments, the processing module 212 may train one or more speech recognition models and/or natural language models based on training data sets comprising the audio/voice commands received from a plurality of users. The training data sets may assist in improving the predictive technology used for recognizing voice commands and generating audio outputs to the user in response to the voice commands. In some embodiments, the processing module 212 may store the audio and voice command data received from the microphone 215 in a backend server (e.g., a server communicatively coupled via a network to the percussive massage device and/or an external device) for a predetermined period of time, in order to allow training and machine learning by the speech recognition models and/or natural language models. In some embodiments, the audio and voice command data stored by the backend server may be removed after the predetermined period of time.

As noted above, training of the one or more speech recognition models and/or natural language models may be optimized for the particular conditions when percussive massage device 200 is in use. Examples of these conditions include different modes or settings, such as speed, in which percussive massage device 200 may be operating when microphone 215 is utilized to receive audio input. Training may include collecting a dataset of received audio input during the different modes or settings. In some embodiments, this dataset may include a variety of different words and phrases that are commonly received during conditions. In some embodiments, percussive massage device 200 may be trained by preprocessing the collected dataset to extract features for accurately recognizing voice commands in loud environments such as denoising to remove background noise to isolate audio input.

In some embodiments, the processing module 212 may be configured to communicate with other devices, servers, wellness hubs, and the like, through a network interface of the percussive massage device 200. In some embodiments, the processing module 212 may be configured to collect data from the percussive massage device 200, including device data, user data, and biometric data. In some embodiments, device data may include data regarding the usage of the percussive massage device 200, such as run-time metrics, speeds used, force levels applied, massage attachments used, battery durations of treatment, frequency of use, and the like. This data may be used to train the one or more speech recognition models and/or natural language models for more accurate speech recognition during these particular usage conditions, as discussed above. In some embodiments, user data may include data regarding location, time, user demographics, user's language, gender, age, income, preferences, and the like. In some embodiments, biometric data may include data regarding a user's heart rate, heart rate variability (HRV), blood pressure (BP), oxygen saturation ($SaO_2$), sleep, body heat, body temperature, physical activity, and the like. In some embodiments, the device data, user data, and biometric data may be collected by at least one of one or more sensors associated with the percussive massage device 200, third party data providers, a wellness hub, and/or wearable devices of the user. In some embodiments, the percussive massage device 200 may collect the device data, user data, and biometric data, analyze the collected data to identify trends and/or correlations in the data, and generate recommendations based on the identified trends or correlations (e.g., through a recommendation engine).

In some embodiments, the controller 201 may be configured to initiate different treatment protocols or routines associated with the percussive massage device 200 based on the voice input received from the user. In some embodiments, the user of the percussive massage device 200 may provide a voice input (received by microphone 215) indicating a level of pain in a specific muscle or muscle group and a length of time associated with the pain. The controller 201 may determine different steps of a treatment protocol designed to target the specified muscle groups in order to provide certain therapeutic effects for the user, and the controller 201 may provide an audio output of the steps to the user via the speaker 210.

In some embodiments, the controller 201 may initiate at least one step of the protocol in which the percussive massage device 200 is configured to perform an action in response to the voice input. In some embodiments, the action comprises at least one of powering on/off the percussive massage device, changing or setting a speed of the motor, setting a predetermined period of time for operating the motor, or the like.

Figure 3:
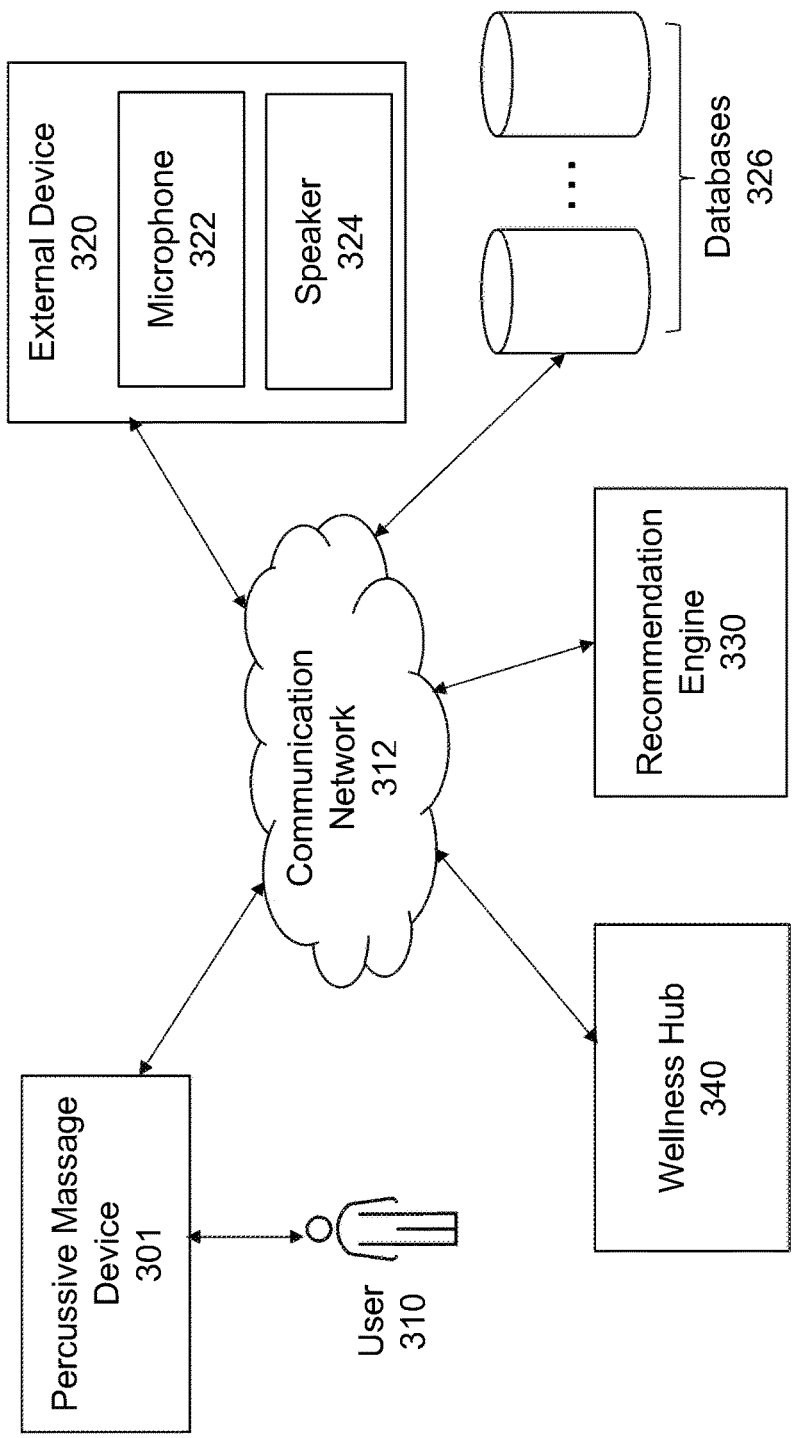
FIG. 3 illustrates an example diagram of a system for voice-activated percussive therapy with a percussive massage device and a mobile device, according to embodiments of the present disclosure.

FIG. 3 illustrates an example diagram of a system 300 for voice-activated percussive therapy with a percussive massage device 301 and an external device 320, according to embodiments of the present disclosure.

System 300 includes a percussive massage device 301, a user 310 of the percussive massage device 301, an external device 320, a plurality of databases 326, a recommendation engine 330, and a wellness hub 340. Percussive massage device 301 represents an exemplary embodiment of percussive massage device 100, 200 in FIGS. 1 and 2, respectively.

The percussive massage device 301, external device 320, plurality of databases 326, recommendation engine 330, and wellness hub 340 are communicatively coupled via a communication network 312. The communication network 312 may be any one or any combination of a LAN (local area network), WAN (wide area network), WPAN (wireless personal area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, In some embodiments, the percussive massage device 301 may include a network interface that allows the device 301 to communicate with other devices (e.g., external device 320, plurality of databases 326, recommendation engine 330, and wellness hub 340) through Bluetooth, Wi-Fi, cellular, and/or the like. In some embodiments, the network interface may comprise a wireless card, a hardware component, or the like, that is configured to allow the percussive massage device 301 to communicate wirelessly over the communication network 312 with various other devices.

In some embodiments, the external device 320 may be a smart phone, mobile phone, personal digital assistant, desktop workstation, laptop or notebook computer, netbook, tablet, smart watch or other wearable, or any combination thereof. The external device 320 may include a microphone 322 and a speaker 324. In some embodiments, the external device 320 may be referred to as a computing device. The external device 320 may include a mobile application installed in a memory of the external device and configured to communicate with at least one of the percussive massage device 301, plurality of databases 326, recommendation engine 330, and wellness hub 340 over the communication network 312.

The wellness hub 340 may be a voice-activated and/or speech-controlled device that is configured to receive and provide voice prompts from and to the user 310. In some embodiments, the wellness hub 340 may be referred to herein as a smart home hub, a smart speaker, or the like. The wellness hub 340 may comprise one or more speakers, microphones, processors, and memory storing automatic speech recognition and/or natural language processing models for processing audio inputs and generating audio outputs to the user 310. In some embodiments, the wellness hub 340 may be located in a same room or location of the user 310, allowing the user 310 to communicate with and receive voice instructions from the wellness hub 340. The wellness hub 340 may be configured with a voice assistant technology that allows the wellness hub 340 to recognize and respond to voice commands from the user 310. The wellness hub 340 may receive audio spoken by the user 310, perform audio and speech processing, generate an audio output based on the audio and speech processing.

In some embodiments, the wellness hub 340 may be a standalone device that can operate and control the percussive massage device 301 based on voice commands from the user. In some embodiments, the wellness hub 340 may also be a charger and/or a charging dock for the percussive massage device 301. In some embodiments, the wellness hub 340 may be connected to and configured to communicate with multiple devices through the communication network 312. For example, the wellness hub 340 may be configured to communicate with and/or connect the percussive massage device 301, external device 320, the plurality of databases 326, and recommendation engine 330 over Wi-Fi. In some embodiments, the wellness hub 340 may also be connected with one or more other therapeutic devices, such as facial treatment devices, compression garments, vibrating arm sleeves, pneumatic compression boots, or any other device or wearable that is configured to provide therapeutic effect to the user 310. By receiving and processing voice prompts from the user 310, the wellness hub 340 may be configured to operate, control, and/or provide instructions to any of the therapeutic devices that are connected to the wellness hub 340 for use by the user 310.

The plurality of databases 326 may be configured to store data collected from the percussive massage device 301, user 310, wellness hub 340, and/or external device 320, such as device data, user data, and biometric data. In some embodiments, device data may include data regarding the usage of the percussive massage device 301, such as run-time metrics, speeds used, force levels applied, massage attachments used, battery durations of treatment, frequency of use, and the like. In some embodiments, user data may include data regarding location, time, user demographics, user's language, gender, age, income, preferences, and the like. In some embodiments, biometric data may include data regarding a user's heart rate, heart rate variability (HRV), blood pressure (BP), oxygen saturation ($SaO_2$), sleep, body heat, body temperature, physical activity, and the like.

In some embodiments, the device data, user data, and biometric data may be collected by at least one of one or more sensors associated with the percussive massage device 301, external device 320, wellness hub 340, third party data providers, and/or wearable devices of the user 310. In some embodiments, the biometric data and/or user data may be based on answers provided by the user 310 in response to one or more surveys or subjective questions prompted by the percussive massage device 301, wellness hub 340, and/or external device 320 to the user 310. For example, the percussive massage device 301, wellness hub 340, and/or external device 320 may receive audio of the user 310 in response to a question, such as "How are you feeling?" and the percussive massage device 301, wellness hub 340, and/or external device 320 may store the received audio of the user 310 as a subset of the biometric data and/or user data in one or more databases 326.

In some embodiments, one or more of the percussive massage device 301, external device 320, and/or wellness hub 340 may collect the device data, user data, and biometric data over Wi-Fi and store the collected data in one or more databases 326 of the plurality of databases 326. In some embodiments, a backend server may retrieve or access the collected data in the one or more databases 326 and analyze the collected data to identify trends and/or correlations in the data. Examples of these trends and/or correlations can be user-specific or demographic-specific. For example, the backend server may detect trends related to a single user's usage of percussive massage device 301, such as particular times or days (e.g., after the user has returned home from work or after exercising on a weekend), the user preferences for particular settings for each session, and usage metrics for each session. Trends related to a user demographic may allow recommendation engine 330 to generate recommendations based on usage and trends determined from other users in one or more common demographic categories (e.g., age, sex, level of activity, and the like). In some embodiments, the backend server may transmit the identified trends and/or correlations in the collected data with recommendation engine 330, and the recommendation engine 330 may generate recommendations based on the identified trends or correlations.

The recommendation engine 330 may be configured to receive collected device data, user data, and biometric data (e.g., from one or more databases 326 and/or the backend server) and generate recommendations regarding the use of percussive massage device 301 and/or other related therapeutic devices 101 and also which treatment protocols or routines to utilize with the one or more recommended therapeutic devices and/or percussive massage device 301. In some embodiments, based on the collected data and identified trends in the data, the recommendation engine 330 may be configured to generate multiple treatment protocols for use by the user 310 for a plurality of different days and for different therapeutic devices.

In some embodiments, the user 310 may provide voice commands to operate the percussive massage device 301 through the microphone 322 installed on the external device 320 and coupled to the mobile application operating on the external device 320. The mobile application on the external device 320 may provide the voice commands received from the microphone 322 to the controller 148, 201 or a backend server, and the controller 148, 201 or backend server may perform the speech recognition and natural language processing to provide an audio response (transmitted through the speaker 324 to the user 310) and/or activate the percussive massage device 301 to perform an action in response to the voice commands.

In some embodiments, the user 310 may provide voice commands to operate the percussive massage device 301 through the wellness hub 340. The wellness hub 340 may provide the received voice commands to the controller 148, 201 or a backend server, and the controller 148, 201 or backend server may perform the speech recognition and natural language processing to provide an audio response (transmitted through the wellness hub 340 to the user 310) and/or activate the percussive massage device 301 to perform an action in response to the voice commands.

In some embodiments, the microphone 322 and speaker 324 of the external device 320 and/or the wellness hub 340 may be utilized instead of or in addition to the microphone 150, 215 and speaker 155, 210 of the percussive massage device 301. In some embodiments, the user 310 may utilize the voice activation features of the percussive massage device 301 through any of the percussive massage device 301 itself, through the microphone 322 and speaker 324 of the external device 320 and/or through the wellness hub 340, depending on the user's preferences, such as ranking preferred voice activation components. By providing the different functionalities, the user 310 may choose which voice activation components to use according to the user's convenience. In some embodiments, percussive massage device 301 and wellness hub 340 may cooperate to determine which device (or both devices) may be used to receive the voice commands. For example, when percussive massage device 301 is in use, wellness hub 340 may be utilized instead of, or in combination with, the microphones of percussive massage device 301 to improve the accuracy of the speech recognition. In some embodiments, the decision to utilize percussive massage device 301, wellness hub 340, or both devices to perform speech recognition may occur dynamically and automatically (i.e., without user input) based on detected conditions such as usage of percussive massage device 301 and a current audio environment of both percussive massage device 301 and wellness hub 340. In some embodiments, user preferences may be given priority over any determination by percussive massage device 301 and wellness hub 340.

Figure 4:
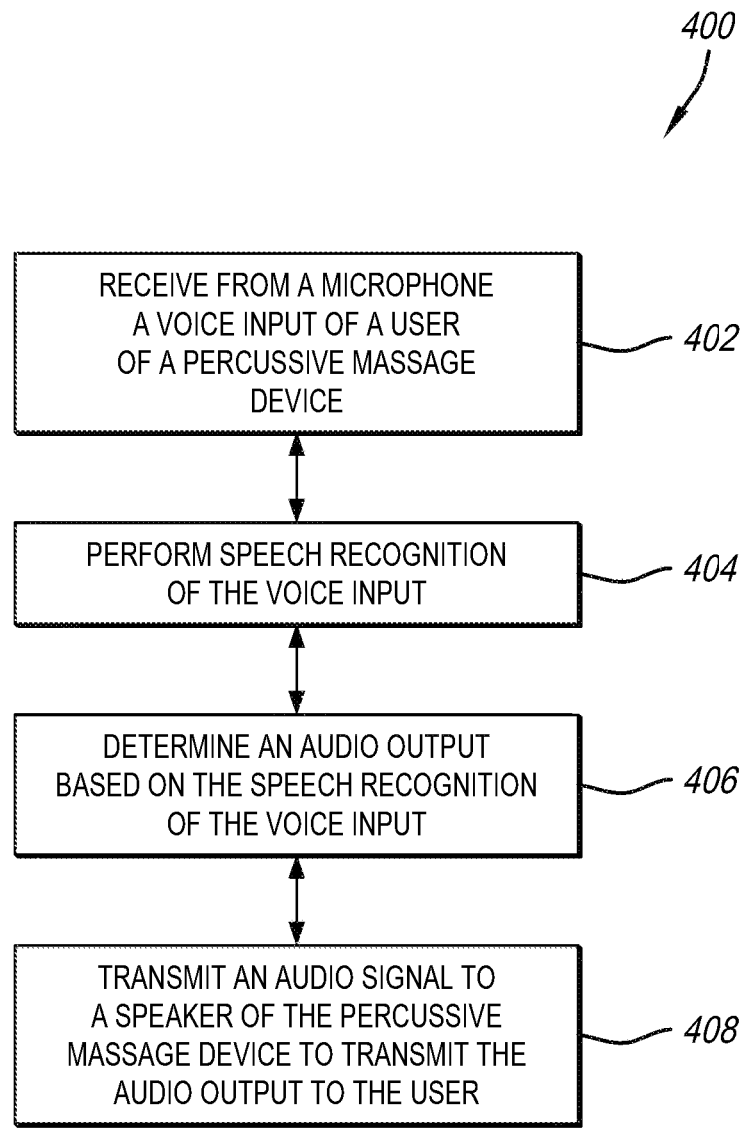
FIG. 4 illustrates an example method for controlling a percussive massage device based on voice activation, according to embodiments of the present disclosure.

FIG. 4 illustrates an example method 400 for controlling a percussive massage device based on voice activation, according to embodiments of the present disclosure. In some embodiments, method 400 may be performed by components of the percussive massage device shown in FIGS. 1-3, as described herein. Method 400 of FIG. 4 begins with step 402 of receiving a voice input of a user of a percussive massage device. In some embodiments, the microphone 150, 215 of the percussive massage device 100, 200 may be configured to receive the voice input of the user and transmit the voice input to the controller 148, 201. In some embodiments, microphone 322 of the external device 320 and/or a microphone of the wellness hub 340 may be configured to receive the voice input of the user and transmit the voice input to a backend server communicatively coupled to external device 320 and/or the wellness hub 340. In some embodiments, determining which microphone or microphones to utilize may be based on any combination of user preferences, current usage of percussive massage device 100, 200, environmental conditions (e.g., background noise) detected by percussive massage device 100, 200, external device 320, and/or wellness hub 340, and/or recommendations provided by a machine learning model.

At step 404, speech recognition of the voice input may be performed. In some embodiments, at least one processor of the controller 148, 201 may perform speech recognition of the voice input by converting audio from the voice input to computer-readable text using one or more speech recognition models. In some embodiments, the one or more speech recognition models may be stored in processing module 212 and/or the memory of the controller 148, 201. In some embodiments, the controller 148, 201 may use the one or more speech recognition models and/or the code stored in the processing module 212 to perform the conversion, processing, and speech recognition steps of the voice input. In additional or alternative embodiments, a backend server may be configured to perform the conversion, processing, and speech recognition of the voice input to reduce the processing performed by the controller 148, 201.

At step 406, an audio output may be determined based on the speech recognition of the voice input. In some embodiments, at least one processor of the controller 148, 201 and/or a backend server may determine the audio output by processing the computer-readable text to identify one or more words using one or more natural language processing models. The at least one processor of the controller 148, 201 and/or the backend server may then generate the audio output in response to the voice input using the one or more natural language processing models. In some embodiments, the one or more natural language processing models may be stored in processing module 212, the memory of the controller 148, 201, and/or the backend server. In some embodiments, the controller 148, 201 and/or the backend server may use the one or more natural language processing models and/or the code stored in the processing module 212 to perform the word/voice command identification, the natural language processing, and audio generation steps for determining the audio output.

At step 408, an audio signal may be transmitted to a speaker to play the audio output to the user of the percussive massage device 100, 200. In some embodiments, the controller 148, 201 and/or the backend server may transmit the audio signal to at least one of the speaker 155, 210 of the percussive massage device 100, 200, speaker 324 of the external device 320, or speaker of the wellness hub 340 to transmit the audio output to the user of the percussive massage device 100, 200.

Figure 5:
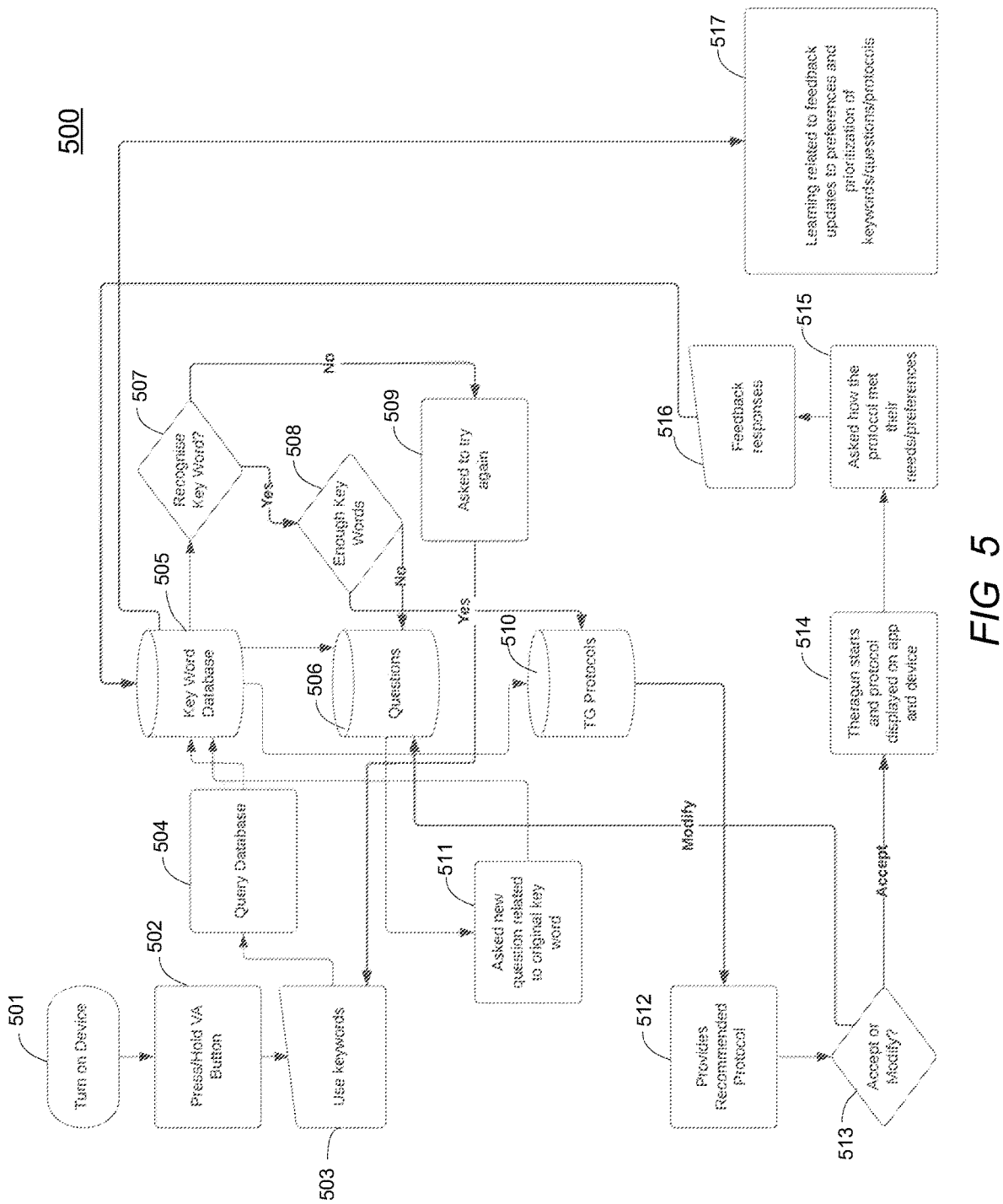
FIG. 5 is an example flowchart showing a method for voice activation features, according to embodiments of the present disclosure.

FIG. 5 is an example flowchart showing a method 500 for voice activation features, according to embodiments of the present disclosure. Method 500 can be performed by processing logic that can comprise hardware (e.g., circuitry, dedicated logic, programmable logic, microcode, etc.), software (e.g., instructions executing on a processing device), or a combination thereof. It is to be appreciated that additional steps may be performed. Moreover, not all steps may be needed to perform the disclosure provided herein. Further, some of the steps may be performed simultaneously, or in a different order than shown in FIG. 5, as will be understood by a person of ordinary skill in the art. Some steps can be combined and performed as a single step. Method 500 may begin with step 501 of powering on the percussive massage device and step 502 of turning on the voice activation feature (e.g., via pressing or holding a button on the device or by a voice command). At step 503, the user of the percussive massage device may speak to the device using one or more keywords. At step 504, the device may query a keyword database 505 based on the speech input of the user.

At step 507, the device may determine if any keywords are recognized from the speech input of the user (e.g., using the processing module 212). If no keywords are recognized, the method proceeds to step 509, where the device requests the user to try again by providing another speech input. If at least one keyword is recognized, the method proceeds to step 508, where the device determines if there are enough recognizable keywords to determine a specific protocol to recommend based on the identified keywords. If there are not enough keywords to determine a specific protocol, then the method proceeds to query a questions database 506 and step 511, in which the device asks the user new questions related to the keyword identified in the original speech input provided by the user. The new questions may be predetermined by the device and may assist in obtaining more information from the user to determine which protocol to recommend for treatment. If there are enough keywords determined in step 508, then the method proceeds to query a protocols database 510 and step 512, where the device determines a protocol to recommend to the user, based on the identified keywords.

The device may provide the recommended protocol to the user, and at step 513, the device may prompt the user with an option to accept or modify the recommended protocol for using the device. If the user chooses to modify the recommended protocol, then the device will query the questions database 506 for new questions to ask the user to obtain more information from the user on which steps of the recommended protocol they would like to modify. If the user chooses to accept the recommended protocol, then the method proceeds to step 514, in which the device initiates the recommended protocol. In some embodiments, the device may initiate the recommended protocol by setting the speed to predetermined values for predetermined periods of time and providing instructions to the user through a mobile application and/or through the device. At step 515, the device may prompt the user for feedback on how the recommended protocol met the user's needs and/or preferences. At steps 516 and 517, the device may receive feedback from the user and use responses received from the user to provide a feedback loop as part of training the speech recognition model for the voice activation and speech recognition features. Based on the user feedback, the device may update one or more of the keyword database 505, questions database 506, and/or the protocols database 510 and continue improving the speech recognition and voice activation algorithms accordingly.

Figure 6:
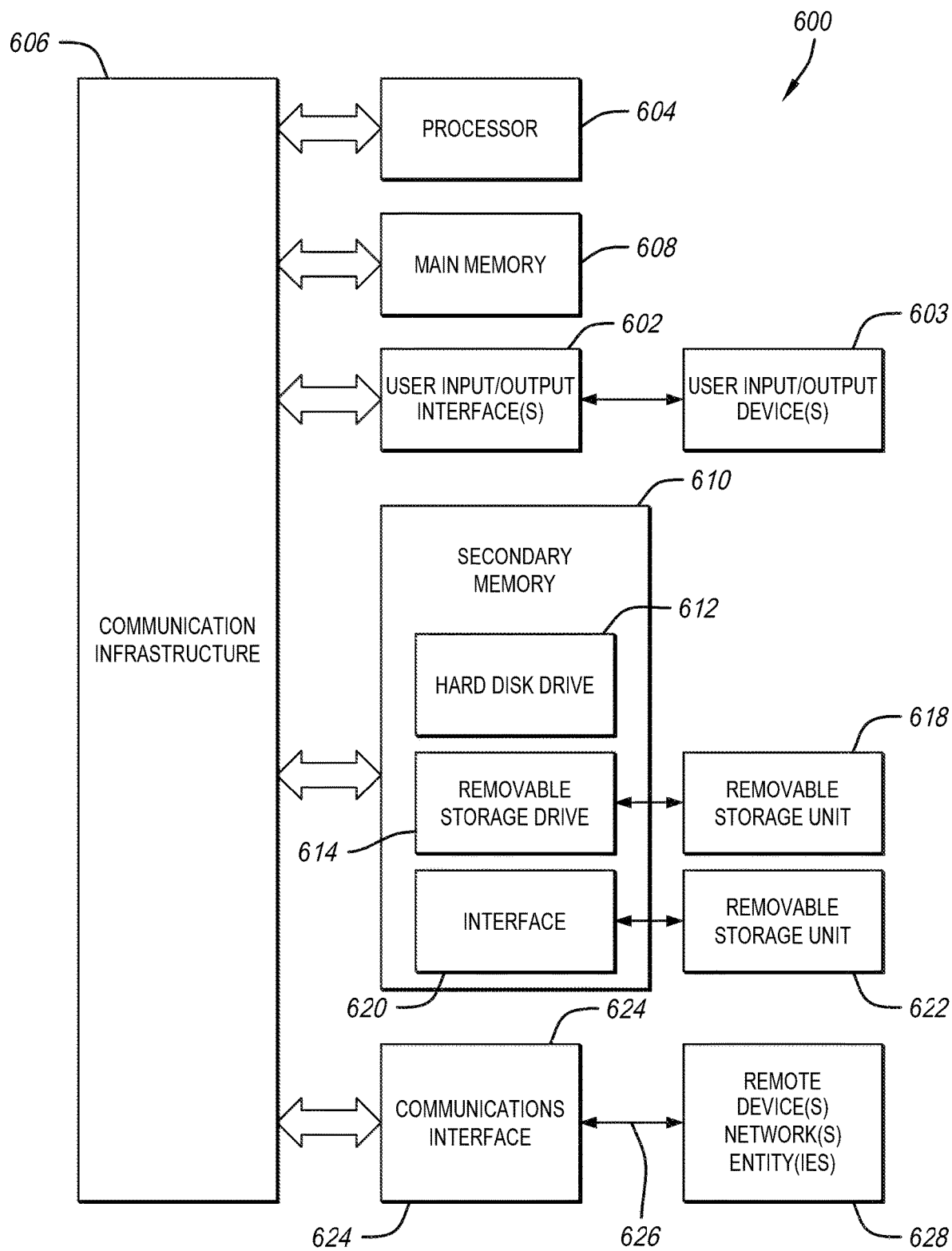
FIG. 6 illustrates a block diagram of example components of a computer system, according to embodiments of the present disclosure.

FIG. 6 is a block diagram of example components of computer system 600. One or more computer systems 600 may be used, for example, to implement any of the embodiments discussed herein, as well as combinations and sub-combinations thereof. In some embodiments, one or more computer systems 500 may be used to implement the method 400 shown in FIG. 4, method 500 shown in FIG. 5, the controller 148 shown in FIG. 1, the controller 201 shown in FIG. 2, and/or the external device 320 shown in FIG. 3, as described herein. Computer system 600 may include one or more processors (also called central processing units, or CPUs), such as a processor 604. Processor 604 may be connected to a communication infrastructure or bus 606.

Computer system 600 may also include user input/output interface(s) 602, such as monitors, keyboards, pointing devices, etc., which may communicate with communication infrastructure 606 through user input/output interface(s) 603.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data. In some embodiments, main memory 608 may include optical logic configured to perform voice activation and voice recognition features.

Computer system 600 may also include one or more secondary storage devices or memory 610. Secondary memory 610 may include, for example, a hard disk drive 612 and/or a removable storage drive 614.

Removable storage drive 614 may interact with a removable storage unit 618. Removable storage unit 618 may include a computer usable or readable storage device having stored thereon computer software (control logic) and/or data. Removable storage unit 618 may be a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626. In some embodiments, computer system 600 may be coupled to a percussive therapy device via a wired or wireless connection through communication interface 624, including electrical wiring, pins, and/or components.

Computer system 600 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A percussive massage device comprising: a housing; a motor positioned in the housing;
   a switch configured to operate the motor;
   a microphone; a speaker; and
   a controller comprising at least one processor and a memory, wherein the controller is coupled to the switch, the microphone, and the speaker, and wherein the controller is configured to:
   receive, from the microphone, a voice input of a user of the percussive massage device;
   perform, by the at least one processor, speech recognition of the voice input, utilizing an active massage setting of the percussive massage device when the voice input was received as context information to improve accuracy of the speech recognition;
   use the active massage setting of the percussive massage device to denoise the voice input to improve the accuracy of the speech recognition;
   determine, by the at least one processor, an audio output based on the speech recognition of the voice input; and
   transmit an audio signal to the speaker to transmit the audio output to the user of the percussive massage device.

2. The percussive massage device of claim 1, further comprising: one or more control units, wherein the controller is further configured to:
   determine an action of the percussive massage device based on the speech recognition; and
   transmit a control signal to at least one of the switch or one of the one or more control units to operate the percussive massage device according to the determined action.

3. The percussive massage device of claim 2, wherein the determined action comprises at least one of powering on or powering off the percussive massage device, changing or setting a speed of the motor, and setting a predetermined period of time for operating the motor.

4. The percussive massage device of claim 2, wherein the one or more control units comprise at least one of an OLED (Organic Light Emitting Diodes) screen control unit, a wireless control unit, a motor drive unit, a pulse-width modulation (PWM) speed setup unit, a wireless control unit, a battery pack control unit, and a power or voltage control unit.

5. The percussive massage device of claim 1, wherein the controller is further configured to:
   determine a treatment protocol of the percussive massage device based on the speech recognition of the voice input.

6. The percussive massage device of claim 5, wherein the controller is further configured to:
   initiate at least one step of the protocol in which the percussive massage device is configured to perform an action in response to the voice input, wherein the action comprises at least one of powering on or powering off the percussive massage device, changing or setting a speed of the motor, and setting a predetermined period of time for operating the motor.

7. The percussive massage device of claim 1, wherein the controller is further configured to store, in the memory, at least one or more speech recognition models, one or more machine learning models, and code.

8. The percussive massage device of claim 7, wherein the controller is further configured to perform the speech recognition of the voice input by:
   converting, by the at least one processor, audio from the voice input to computer-readable text using the one or more speech recognition models.

9. The percussive massage device of claim 7, wherein the controller is further configured to determine the audio output based on the speech recognition of the voice input by:
   processing, by the at least one processor, the computer-readable text to identify one or more words using the one or more natural language processing models; and
   generating, by the at least one processor, the audio output in response to the voice input using the one or more natural language processing models.

10. The percussive massage device of claim 1, wherein the housing includes first, second, and third handle portions arranged to define a handle opening, and wherein the microphone is housed in at least one of the first, second, and third handle portions.

11. The percussive massage device of claim 1, wherein the housing includes first, second, and third handle portions arranged to define a handle opening, and wherein the speaker is housed in at least one of the first, second, and third handle portions.

* * * * *